US012503488B2

(12) United States Patent
Rammo et al.

(10) Patent No.: US 12,503,488 B2
(45) Date of Patent: Dec. 23, 2025

(54) REUSE OF INTEIN-BOUND RESINS FOR PROTEIN PURIFICATION

(71) Applicant: Merck Patent GmbH, Darmstadt (DE)

(72) Inventors: Oliver Rammo, Darmstadt (DE); Romas Skudas, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 644 days.

(21) Appl. No.: 17/796,720

(22) PCT Filed: Mar. 23, 2021

(86) PCT No.: PCT/EP2021/057399
§ 371 (c)(1),
(2) Date: Aug. 1, 2022

(87) PCT Pub. No.: WO2021/191194
PCT Pub. Date: Sep. 30, 2021

(65) Prior Publication Data
US 2023/0064395 A1    Mar. 2, 2023

(30) Foreign Application Priority Data

Mar. 25, 2020 (EP) .................................... 20165535

(51) Int. Cl.
*C07K 1/22* (2006.01)
*B01J 49/00* (2017.01)

(52) U.S. Cl.
CPC .................. *C07K 1/22* (2013.01); *B01J 49/00* (2013.01); *C07K 2319/92* (2013.01)

(58) Field of Classification Search
CPC .......... C07K 1/22; C07K 2319/92; B01J 49/00
See application file for complete search history.

(56) References Cited

U.S. PATENT DOCUMENTS

| | | | |
|---|---|---|---|
| 9,149,738 B2 † | 10/2015 | Skudas | |
| 10,087,213 B2 † | 10/2018 | Chen | |
| 11,124,539 B2 † | 9/2021 | Ohman | |
| 11,326,154 B2 † | 5/2022 | Zillmann | |

(Continued)

FOREIGN PATENT DOCUMENTS

| | | | |
|---|---|---|---|
| CN | 101884910 A | † | 11/2010 |
| WO | 2014/110393 A1 | | 7/2014 |

OTHER PUBLICATIONS

International Search Report dated Jun. 23, 2021 issued in corresponding PCT/EP2021/057399 application (3 pages).

(Continued)

*Primary Examiner* — Robert B Mondesi
*Assistant Examiner* — Benjamin Hall Easton
(74) *Attorney, Agent, or Firm* — EMD Millipore Corporation

(57) ABSTRACT

The present disclosure relates to methods of protein purification by attaching an intein-C fragment to a target protein, passing a sample containing the intein-C tagged protein over a chromatographic resin carrying an intein-N fragment so as to create an intein-N intein-C complex, releasing the target protein from the intein-C fragment, and regenerating the column under conditions that disrupt the intein-N intein-C complex while preserving column functionality for multiple reuses.

20 Claims, 18 Drawing Sheets

(56) References Cited

U.S. PATENT DOCUMENTS

| | | |
|---|---|---|
| 2015/0353597 A1 | 12/2015 | Chen et al. |
| 2024/0132538 A1* | 4/2024 | Sevinsky ............. C12N 9/1252 |

OTHER PUBLICATIONS

H.M. Beyer et al., "The Crystal Structure of the Naturally Split GP41-1 Intein Guides The Engineering of Orthogonal Split Inteins From Cis-Splicing Inteins", The FEBS Journal, vol. 287 (2020) pp. 1886-1898.

D. Guan et al., "Split Intein Mediated Ultra-Rapid Purification of Tagless Protein (SIRP)", Biotechnology and Bioengineering, vol. 110, No. 9 (Sep. 2013) pp. 2471-2481.

Search Report in corresponding EP appln. 21 713 035.0 dated Oct. 6, 2023 (pp. 1-5).

Meredith a Cooper: "Creating an Efficient Biopharmaceutical Factory: Protein Expression and Purification Using a Self-Cleaving Split Intein", Pho Thesis, Ohio State University, US, Jan. 1, 2018 (Jan. 1, 2018), pp. 1-175, XP009526111, ISBN: 978-1-392-17721-1.

Miquel Vila-Perella et al: 58 page Supplementary information to "Streamlined Expressed Protein Ligation Using Split inteins", Journal of the American Chemical Society, vol. 135, No. 1, Jan. 9, 2013 (Jan. 9, 2013), pp. 286-292, XP055240219, ISSN: 0002-7863, DOI: 10.1021/ja309126m.

Vila-Perella Miquel et al: "Streamlined Expressed Protein Ligation Using Split Inteins", Journal of the American Chemical Society, vol. 135, No. 1, Jan. 9, 2013 (Jan. 9, 2013), pp. 286-292, XP093086592, ISSN: 0002-7863, DOI: 10.1021/ja309126m.

Frieden Carl, Protein-protein interaction and enzymatic activity, Annual Review of Biochemistry, Jul. 1971, vol. 40, pp. 653-696. ISSN: 0066-4154, DOI:10.1146/annurev.bi.40.070171.003253. Number of pages submitted: 46 Source: AnnualReviews.†

Chen Lixin, Pradhan S., Evans T.C. Jr. Herbicide resistance from a divided EPSPS protein: the split Synechocystis DnaE intein as an in vivo affinity domain, Gene; vol. 263 issues 1-2, Jan. 24, 2001, pp. 39-48. ISSN 0378-1119,DOI:10.1016/s0378-1119(00)00568-0. Number of pages submitted: 10 Source: Elsevier.†

Lu Wei, Sun Z., Tang Y., Chen J., Tang F., Zhang J., Liu J.N., Split intein facilitated tag affinity purification for recombinant proteins with controllable tag removal by inducible auto-cleavage, Journal of Chromatography A; May 6, 2011; vol. 1218, issue 18, pp. 2553-2560. ISSN: 0021-9673, DOI: 10.1016/j.chroma.2011.02.053. (Available Online Mar. 10, 2011) Number of pages submitted: 8 Source: Elsevier.†

Tzu-Chiang Han, Control of Intein-Mediated Self-Cleaving Tag for Recombinant Protein Purification, Dissertation, 2016, pp. 1-179. (Online access http://rave.ohiolink.edu/etdc/view?acc_num=osu1453206997) Deposited at Ohio State University: Jan. 15, 2016 (public doctoral oral defense of the dissertation was performed on Jan. 15, 2016 at the Ohio State University, Dept. of Chemical and Biomolecular Engineering, Columbus, Ohio, USA).†

Merideth Ann Cooper, Creating an Efficient Biopharmaceutical Factory: Protein Expression and Purification Using a Self-Cleaving Split Intein, (Doctoral Dissertation), Deposited at Ohio State University: May 7, 2018 (public doctoral oral defense of the dissertation was performed on Mar. 26, 2018 at the Ohio State University, Dept. of Chemical and Biomolecular Engineering, Columbus, Ohio, USA) Number of pages submitted: 175 Source: Online access http://rave.ohiolink.edu/etdc/view?acc_num=osu152226172238882) Special interest: Regeneration of the NpuNSulfoLink Resin (Chapter 4).†

Grönberg, Anna; Hjorth, R.A.; Cleaning-in-Place and Sanitization (Chapter33); Biopharmaceutical Processing Development, Design, and Implementation of Manufacturing Processes; 1st Edition; Jagschies, G., Lindskog, E., Lacki, K., Galliher, P.M., Eds.; Elsevier; Jan. 2018, pp. 675-699 Number of pages submitted: 25ISBN: 978-0-08-100623-8, DOI: 10.1016/B978-0-08-100623-8.00033-5 Source:Elsevier, Amsterdam, Netherlands.†

\* cited by examiner
† cited by third party

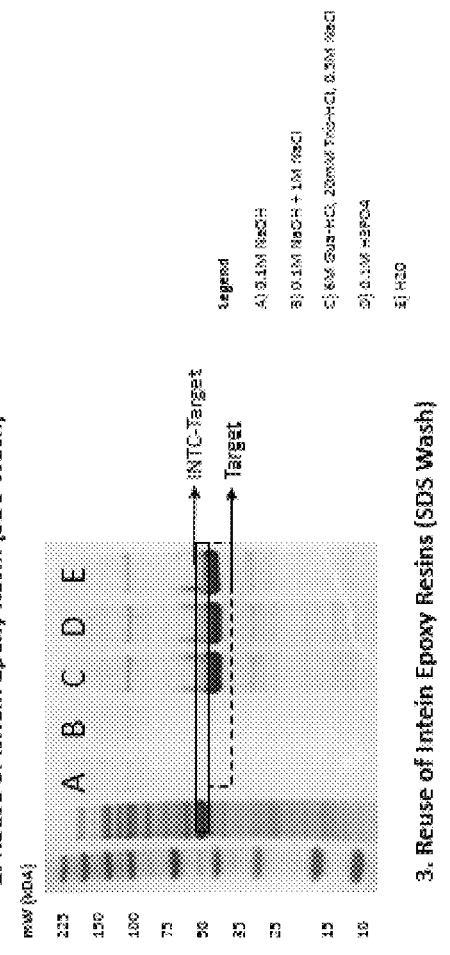
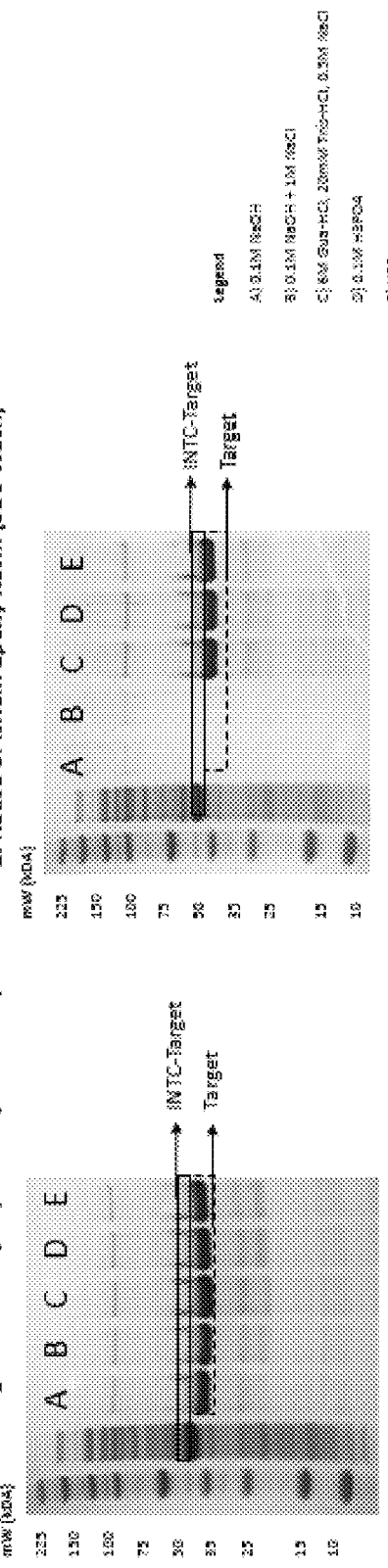
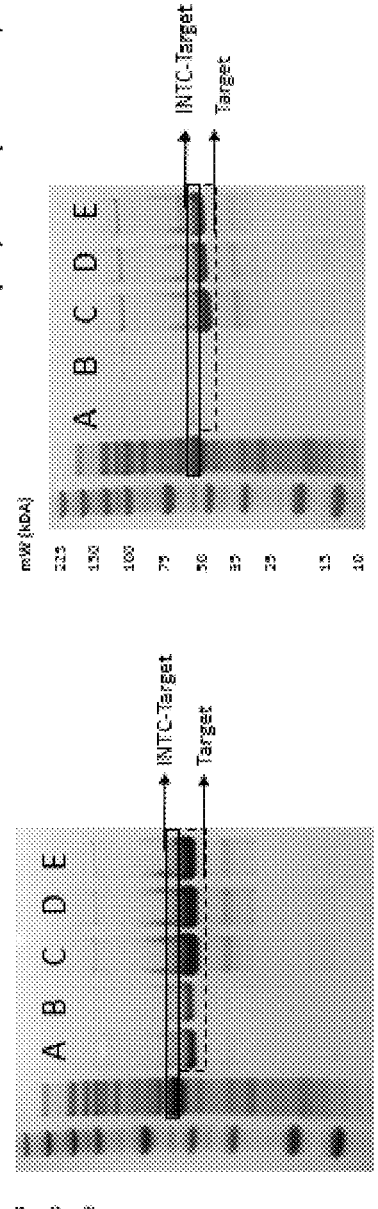
FIG. 16

REUSE OF INTEIN-BOUND RESINS FOR PROTEIN PURIFICATION

FIELD

The present disclosure relates to methods of protein purification by attaching an intein-C fragment to a target protein, passing a sample containing the intein-C tagged protein over a chromatographic resin carrying an intein-N fragment so as to create an intein-N intein-C complex, releasing the target protein from the intein-C fragment, and regenerating the column under conditions that disrupt the intein-N intein-C complex while preserving column functionality for multiple reuses.

BACKGROUND

Inteins are autocatalytic proteins that are capable of self-splicing from a precursor protein, resulting in a joining of the flanking proteins (exteins) via a peptidic bond. Inteins have become increasingly popular for diverse applications in biotechnology, chemical biology and synthetic biology, because of their ability to tolerate deliberate exchange of extein sequences, as well as the existence of naturally occurring split inteins reconstituting a functional protein from two polypeptide chains.

In one application, intein technology can be used for purification of target proteins. The intein specific splicing process can be modified through various mutations including a single point mutation in the N-terminal intein fragment to result in only C-terminal splicing activity, i.e., Cleavage. Thus, intein-N fragments can be immobilized as affinity ligand on a chromatographic support whereas the intein-C serves as purification tag on the target molecule, e.g., a protein. Due to their ability to specifically associate under given conditions, the intein-C tagged target molecule can be successfully isolated from a feed stock whereas all the other impurities stay in the flow-through. The release of the target protein is subsequentially induced through a change in the buffer system driven by additives such as thiol containing compounds or reducing agents, pH or temperature.

Once the target molecule has been successfully cleaved, the chromatography resin-bound intein complex can be regenerated by disrupting the Intein-N Intein-C complex, to allow for multiple uses. Guan et al. (*Biotechnol Bioeng.* 2013 September; 110 (9): 2471-81) describe dissociation of an intein-C fragment by washing with high salt and pH buffer pH>11. However, the high pH environment leads to a stepwise loss of the intein-N functionality, thus limiting the reuse potential of the chromatography resin. The ability to reuse the intein-N bound resin to bind an intein-C fragment in multiple rounds without losing functionality, is a crucial parameter for an economically viable purification process, wherein the intein-N fragment covalently immobilized on a chromatographic support preferably maintains >60% of its initial functionality or binding capacity after each round of column regeneration. There is a need in the art for efficient methods to regenerate intein-N covalently bound columns, without disrupting column functionality.

SUMMARY

The present disclosure relates to methods of protein purification by attaching an intein-C fragment to a target protein, passing a sample containing the intein-C tagged protein over a chromatographic resin carrying an intein-N fragment so as to create an intein-N intein-C complex, releasing the target protein from the intein-C fragment, and regenerating the column under conditions that disrupt the intein-N intein-C complex while preserving column functionality for multiple reuses.

It has now surprisingly been found that intein-N intein-C complexes can be efficiently disrupted to release the intein-C fragment from an intein-N fragment that is immobilized on chromatographic resin, without affecting the intein-N stability and functionality. In one embodiment, the process of disrupting the intein-N intein-C complex and regenerating the intein-N column for further reuse utilizes an acidic buffer having a pH of about 1 to about 4, preferably about 1 to about 2. Due to a change in the electrostatic environment, the intein-N intein-C complex that is formed due to extensive charge-charge interactions will be disrupted, causing release of the intein-C fragment. In other embodiments, detergents and/or chaotropic and/or kosmotropic reagents are used to alter the tertiary structure of the intein, leading to a structural disruption of the intein-N intein-C complex. In yet other embodiments, the process includes multiple cycles of protein purification and column generation, with concurrent or sequential use of acidic buffers, detergents and/or chaotropic and/or kosmotropic reagents for the regeneration steps. Optionally, basic buffers are included in part of the regeneration cycles. As demonstrated herein, under these conditions, intein-N fragments, immobilized through various attachment chemistries targeting multi or single point intein-N attachment to a chromatographic support, retained their functionality after multiple rounds of protein purification.

Thus, in one embodiment, the present disclosure provides a method for purifying a target molecule in a sample, by (a) providing a sample containing a fusion protein comprising an intein-C polypeptide joined to a target molecule by a peptide bond (intein-C tagged target molecule); (b) contacting the sample with a chromatography resin comprising a covalently-linked N-terminal intein polypeptide, under conditions in which the intein-C polypeptide in the fusion protein binds to the intein-N polypeptide in the resin to form an intein complex; (c) optionally washing the resin containing the intein complex to remove unbound contaminants; (d) exposing the intein complex to conditions sufficient to release the target molecule from the intein-C polypeptide; (e) regenerating the chromatographic resin by contacting the resin with one or more compositions selected from the group consisting of: (i) a composition having a pH in aqueous solution of about 1 to about 4; (ii) a composition comprising at least one detergent; and (iii) a composition comprising at least one kosmotropic agent and/or chaotropic agent so as to disrupt the intein-N intein-C complex and release the intein-C polypeptide from the chromatography resin; and (f) optionally, performing at least one additional purification cycle by repeating steps (a) to (e) at least once. According to the principles of the present invention, the regenerated chromatography resin obtained from step (e) or optional step (f) retains at least about 60%, preferably at least about 70% and more preferably at least about 80% of its C-terminal intein binding capacity after each purification cycle.

The principles of the present disclosure are exemplified with a naturally fragmented gp41-1 intein and variants thereof that share a high structural and functional homology to other split inteins such as NpuDnaE and/or mini inteins such as NpuDnaB (Beyer, H. M et al., *FEBS Journal*, 2019. It was also observed that the gp41-1 intein-N and intein-C association works in a proposed "capture and collapse" model that is also valid for other naturally split inteins such as NpuDnaE (Beyer, 2019). Due to the structural and functional homology in intein fragments, it is apparent to a person of skill in the art that the methods described herein are applicable for other intein-C and intein-N complexes.

BRIEF DESCRIPTION OF THE DRAWINGS

The disclosure is illustrated in the figures of the accompanying drawings which are meant to be exemplary and not limiting, in which like references are intended to refer to like or corresponding parts, and in which:

FIG. 11B: Cycle 2) represent a comparable band pattern observed from fractions E1, E2 and CIP between the two cycles of using column prototype 18RSAB007 and a 40 kDa IC-target (DNAJ).

FIG. 16: Chromatography Column carrying intein-N ligand were reused 4 times while exposing consecutively to 15/150/1500/1620 min of solution A (0.1M NaOH), B (0.1M NaOH+1M NaCl), C (6M Guanidine-HCl, 20 mM Tris-HCl, 0.5M NaCl), D (0.15 $H_3PO_4$), and E ($H_2O$). Intein-C tagged Target protein (INTC-Target) was loaded and captured on the column with at pH 9, then cleaved through change in pH to pH7. Between each step of Column reuse, the column was washed with 2CV 10% SDS. SDS-Page represents the released target within 20 h under cleavage reaction at Room Temperature. Gels were visualized with a Coomassie blue stain.

DETAILED DESCRIPTION

Figure 1:
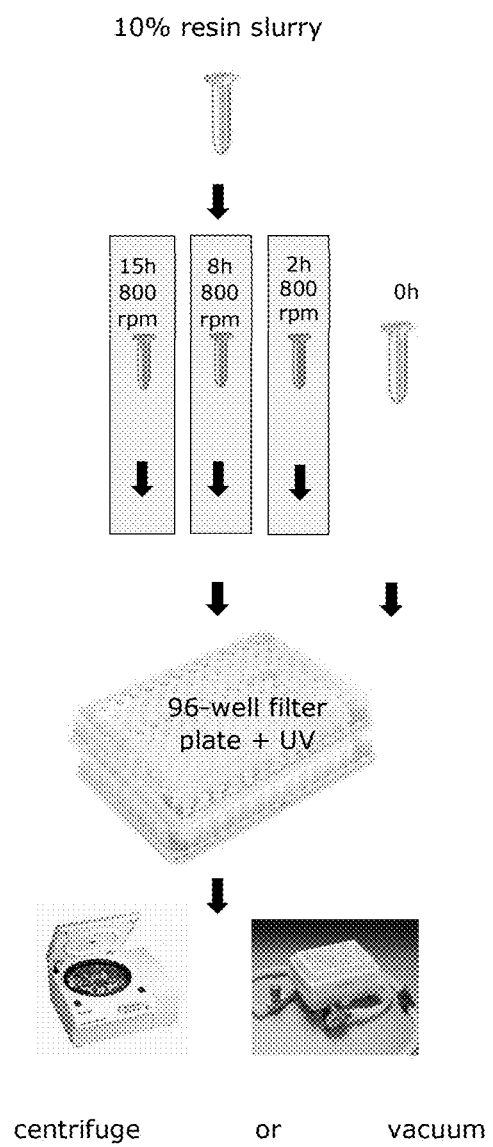
FIG. 1: Depicts a scheme of a Static Binding Capacity (SBC) assay with alkaline (NaOH) and acid ($H_3PO_4$) solutions.

The present disclosure describes a method for regeneration and reuse of intein-N ligands that are covalently immobilized on a chromatographic solid support. The intein-N columns are regenerated by disrupting an intein-N intein-C complex using acidic buffers, detergents, chaotropic and/or kosmotropic agents, each alone or in combination with each other, concurrently or sequentially in any order, in one or more purification cycles. Optionally, basic buffers are used a part of the regeneration steps. The process of the present disclosure involves the recovery of column functionality (i.e., intein-C binding capacity) of about ≥60%, preferably about >70%, more preferably ≥90% of column and even more preferably ≥90% functionality after each round of purification.

(1) Definitions

In order that the present disclosure may be more readily understood, certain terms are first defined. Additional definitions are set forth throughout the detailed description. Unless defined otherwise, all technical and scientific terms used herein have the same meaning as commonly understood by one of ordinary skill in the art to which this invention pertains.

The term "target molecule" as used herein refers to a biological molecule (e.g., protein), material or macromolecular assembly, which is to be, e.g., purified or removed from a mixture (e.g., a clarified protein mixture). Exemplary target molecules include, for example, recombinant peptides and proteins, including antibodies (e.g., monoclonal antibodies), vaccines, viruses, and other macromolecular assemblies, such as virus-like particles and nanoparticles that may incorporate both biomolecular and synthetic components. By way of example, target molecules can include proteins and biomolecular assemblies (e.g., produced by recombinant DNA technology), such as, e.g., hormones (e.g. insulin, human growth hormone, erythropoietin, interferons, granulocyte colony stimulating factor, tissue plasminogen activator), monoclonal antibodies (mAbs) and mAb-derivatives (e.g., bi-specific mAbs, Fabs, scFvs, shark and camelid antibodies), scaffold-derived therapeutics (e.g., DARPins, Affibodies, anticalins), therapeutic enzymes (e.g., alpha galactosidase A, alpha-L-iduronidase, N-acetylgalactosamine-4-sulfatase, glucocerebrosidase), toxins (e.g. botulinum, CRM 197, ricin), recombinant vaccines (e.g., anthrax, diphtheria, tetanus, pneumonia, hepatitis B virus, human papilloma virus), virus-like particles (e.g., hepatitis B, human papilloma, influenza, parvovirus, Norwalk viruses), as well as industrial enzymes (e.g., papain, bromelain, trypsin, proteinase K, BENZONASE®. enzyme, DENERASE™ enzyme, urease, pepsin, and the like) diagnostic reagents (e.g., glucose and lactate dehydrogenase, DNA polymerases, alkaline phosphatase, horseradish peroxidase, restriction enzymes, hybridoma-derived antibodies and the like), and viral vectors (e.g., *Lenti* Virus vector, Adeno Associated Virus (AAV) vector, herpex simplex-1 viral vector (HSV-1), and the like).

The term "fusion protein" as used herein refers to a naturally occurring, synthetic, semi-synthetic or recombinant single protein molecule that comprises all or a portion of two or more heterologous polypeptides joined by peptide bonds.

The term "peptide", "peptidic", as used herein, refers to peptides and proteins longer than two amino acids in length that may also incorporate non-amino acid molecules.

The term "polypeptide" refers to a polymer of amino acids, and not to a specific length; thus, peptides, oligopeptides and proteins are included within the definition of a polypeptide.

The term "intein", as used herein, refers to a protein, either isolated from nature or created through recombinant DNA technology, with autocatalytic activity. Inteins contain internal sequences or segments that may be spliced out of the larger molecule after it is translated, leaving the remaining segments (the "exteins") to rejoin and form a new protein The term "split intein", as used herein, refers to a protein, either isolated from nature or created through recombinant DNA technology, that has the following properties: (1) the protein occurs in two halves that interact with high affinity and selectivity; (2) the two halves must contain all intein sequences required for catalytic activity and may also contain appended non-intein-N peptidic sequences; (3) the protein has enzymatic activity only when the two halves are tightly associated; and (4) the enzymatic activity is site selective peptidic cleavage or ligation that serves to separate intein sequences from non-intein-N peptidic sequences or ligate the non-intein-N peptidic sequences into contiguous linear or circular proteins.

The term "complementary inteins" is used herein to refer to the intein-N and intein-C portions of a split intein pair.

The term "intein-N", as used herein, refers to an intein polypeptide having homology to the N-terminal portion of a single intein polypeptide, and which associates with a complementary intein-C to form an active intein enzyme.

The term "intein-C", as used herein, refers to an intein polypeptide having homology to the C-terminal portion of a single intein polypeptide, and which associates with a complementary intein-N to form an active intein enzyme.

The term "extein", as used herein, refers to N- and C-terminal peptidic sequences that are fused to N- and intein-Cs in nature and are manipulated (e.g., cleaved or ligated) through the enzymatic action of the split intein.

The term "chromatography," as used herein, refers to a dynamic separation technique which separates a target molecule of interest from other molecules in the mixture and allows it to be isolated. Typically, in a chromatography method, a mobile phase (liquid or gas) transports a sample containing the target molecule of interest across or through a stationary phase (normally solid) medium. Differences in partition or affinity to the stationary phase separate the different molecules while mobile phase carries the different molecules out at different time.

The term "affinity chromatography," as used herein, refers to a mode of chromatography where a target molecule to be separated is isolated by its interaction with a molecule (e.g., an affinity chromatography ligand according to this invention comprising an intein-N and intein-N solubilization factor) which specifically interacts with the target molecule. In one embodiment, affinity chromatography involves the addition of a sample containing a target molecule (e.g., a protein) to a solid support which carries on it an intein-N-based ligand, as described herein.

(2) Description of the Process of the Invention

The present disclosure provides a method for purifying a target molecule in a sample, by:
(a) providing a sample containing a fusion protein comprising an intein-C polypeptide joined to a target molecule by a peptide bond (intein-C tagged target molecule);
(b) contacting the sample with a chromatography resin comprising a covalently-linked N-terminal intein polypeptide, under conditions in which the intein-C polypeptide in the fusion protein binds to the intein-N polypeptide in the resin to form an intein complex;
(c) optionally washing the resin containing the intein complex to remove unbound contaminants;
(d) exposing the intein complex to conditions sufficient to release the target molecule from the intein-C polypeptide;
(e) regenerating the chromatographic resin by contacting the resin with one or more compositions selected from the group consisting of:
  (i) a composition having a pH in aqueous solution of about 1 to about 4;
  (ii) a composition comprising at least one detergent; and
  (iii) a composition comprising at least one kosmotropic agent and/or chaotropic agent
  so as to disrupt the intein-N intein-C complex and release the intein-C polypeptide from the chromatography resin; and
(f) optionally, performing at least one additional purification cycle by repeating steps (a) to (e) at least once.

In one embodiment, step (e) further comprises the step of (iv) regenerating the chromatographic resin by contacting the resin with a composition having a pH in aqueous solution of about 9 to about 14, preferably a pH of about 10-14 in aqueous solution.

According to the principles of the present invention, the regenerated chromatography resin obtained from step (e) or optional step (f) retains at least about 60%, preferably at least about 70% and more preferably at least about 80% of its C-terminal intein binding capacity after each purification cycle.

The process described herein involves affinity chromatography for purifying a target biological molecule, utilizing intein-N ligands covalently bound on a chromatography resin, which is preferably attached to a solid support. Intein-C tagged proteins are passed through the column under conditions sufficient to form a stable complex between the intein-N fragment and the intein-C fragment. After an optional washing step to remove process contaminants, tagless release of the target is triggered by a change in the pH. Finally, the column is regenerated by introducing an electrostatic environment (with acidic buffers) and/or changes in the protein tertiary structure (with chaotropic agents, kosmotropic agents and/or detergents), so as to disrupt the intein-N and intein-C complex and regenerate the intein-N resin.

The process of the invention can be performed once, i.e., a single purification and regeneration cycle, but is preferably performed multiple times by subjecting the intein-N column to multiple purification and regeneration cycles. In some embodiments, the conditions of regenerating the intein-N columns can be the same each purification cycle. In some embodiments, the conditions of generating the intein-N columns alternate each purification cycle using regeneration sequences as exemplarily described below, but which can be varied based on the individual columns and as contemplated by a skilled artisan.

For example, in one embodiment, the column is regenerated once or multiple times using a composition having a pH in aqueous solution of about 1 to about 4 (i.e., an acidic buffer). In another embodiment, the column is generated once or multiple times using a composition comprising a chaotropic agent. In another embodiment, the column is generated once or multiple times using a composition comprising a kosmotropic agent. In another embodiment, the column is generated using a composition comprising a detergent.

In other embodiments, the column is regenerated multiple times, each time using one or more reagents selected form the group consisting of an acidic buffer having a pH in aqueous solution of about 1 to about 4, a chaotropic agent, a kosmotropic agent and a detergent. In some embodiments, the individual reagents may each independently of the other be used in at least some of the purification cycles, at a periodicity of about 10%, about 20%, about 30%, about 40%, about 50%, about 60%, about 70%, about 80% or about 90% of the purification cycles, or about 100% of the purification cycles, as determined by a person of skill in the art.

In some embodiments, basic buffers can also be incorporated into a portion of the purification steps, with periodicity to be determined by a person of skill in the art. The basic buffers preferably have a pH of about 9 to about 14, more preferably a pH of about 11 to about 14, or preferably a pH of about 10 to about 12. Thus, the basic buffer can be used for column regeneration every other cycle (i.e., about 50% of the purification cycles), or alternatively in about 10%, about 20%, about 30%, about 40%, about 60%, about 70%, about 80% or about 90% of the purification cycles.

The Regeneration step may be performed for any length of time required to disrupt the intein-N and intein-C complex. Typical regeneration time is up to 120 minutes, but can be longer or shorter depending on the reaction. Moreover, the regeneration can be performed under static incubation or constant flow representing residence times of 0-120 min per Column Volume (CV).

The process of the present disclosure preferably involves the recovery of column functionality (i.e., intein-C binding capacity) of about ≥60% each purification cycle. Thus, after first column reuse, the column retains an intein-C binding capacity that is at least about 60% of its initial binding capacity, e.g., at least about 70% of the its initial binding capacity, or at least about 80% of its initial binding capacity, or at least about 90% of its initial binding capacity, or at least about 95% of its initial binding capacity, or at least about 99% of its initial binding capacity. Thereafter, the column preferably retains at least about 60% of its intein-C binding capacity after each purification cycle. In some embodiments, the column retains its intein-C binding capacity of at least about 70% after each purification cycle. In some embodiments, the column retains its intein-C binding capacity of at least about 80% after each purification cycle. In some embodiments, the column retains its intein-C binding capacity of at least about 90% after each purification cycle. In some embodiments, the column retains its intein-C binding capacity of at least about 95% after each purification cycle. In some embodiments, the column retains its intein-C binding capacity of at least about 99% after each purification cycle.

In some embodiments, step (e) (i) is performed in at least one purification cycle, and at least one of steps (e) (ii), (e) (iii) and (e) (iv) are performed in at least 10% of the purification cycles, preferably in at least about 25% of the purification cycles, and more preferably in at least about 50% of the purification cycles.

In other embodiments, step (e) (ii) is performed in at least one purification cycle, and at least one of steps (e) (i), (e) (iii) and (e) (iv) are performed in at least 10% of the purification cycles, preferably in at least about 25% of the purification cycles, and more preferably in at least about 50% of the purification cycles.

In other embodiments, step (e) (iii) is performed in at least one purification cycle, and at least one of steps (e) (i), (e) (ii) and (e) (iv) are performed in at least 10% of the purification cycles, preferably in at least about 25% of the purification cycles, and more preferably in at least about 50% of the purification cycles.

Thus, in exemplary embodiments:
(A) step (e) (i) and (e) (ii) are performed, concurrently or sequentially, in any order; or
(B) step (e) (i) and (e) (iii) are performed, concurrently or sequentially, in any order; or
(C) step (e) (ii) and (e) (iii) are performed, concurrently or sequentially, in any order; or
(D) step (e) (i) and (e) (ii) and (e) (iii) are performed, concurrently or sequentially, in any order;
(E) step (e) (i) and (e) (iv) are performed, concurrently or sequentially, in any order; or
(G) step (e) (ii) and (e) (iv) are performed, concurrently or sequentially, in any order; or
(G) step (e) (iii) and (e) (iv) are performed, concurrently or sequentially, in any order; or
(H) step (e) (i), (e) (ii) and (e) (iv) are performed, concurrently or sequentially, in any order; or
(I) step (e) (i), (e) (iii) and (e) (iv) are performed, concurrently or sequentially, in any order; or
(J) step (e) (ii), (e) (iii) and (e) (iv) are performed, concurrently or sequentially, in any order; or
(K) step (e) (i), (e) (ii), (e) (iii) and (e) (iv) are performed, concurrently or sequentially, in any order,
wherein, when any of steps (e) (i), (e) (ii), (e) (iii) and/or (e) (iv) are performed, such step or steps are independently of each other performed in at least 10% of the purification cycles, preferably in at least about 25% of the purification cycles, and more preferably in at least about 50% of the purification cycles.

(3) Alternative Embodiments of Carrying Out the Present Invention

In one exemplary embodiment, the present invention provides a method for purifying a target molecule in a sample which involves intein-N column regeneration using an acidic buffer. In accordance with this embodiment, the present invention comprises the steps of (a) providing a sample containing a fusion protein comprising an intein-C polypeptide joined to a target molecule by a peptide bond (intein-C tagged target molecule); (b) contacting the sample with a chromatography resin comprising a covalently-linked N-terminal intein polypeptide, under conditions in which the intein-C polypeptide in the fusion protein binds to the Intein-N polypeptide in the resin to form an intein complex; (c) optionally washing the resin containing the intein complex to remove unbound contaminants; (d) exposing the intein complex to conditions sufficient to release the target molecule from the intein-C polypeptide; (e) regenerating the chromatographic resin by contacting the resin with a composition having a pH in aqueous solution of about 1 to about 4, so as to disrupt the intein-N intein-C complex and release the intein-C polypeptide from the chromatography resin; and (f) optionally, performing at least one additional purification cycle by repeating steps (a) to (e) at least once. According to the principles of the present invention, the regenerated chromatography resin obtained from step (e) or optional step (f) retains at least about 60%, preferably at least about 70% and more preferably at least about 80% of its C-terminal intein binding capacity after each purification cycle.

In some embodiments, the composition having a pH in aqueous solution between about 1 and about 4 is an acidic buffer. In other embodiments, the acidic buffer has a pH in aqueous solution of about 1 to about 3.5. In other embodiments, the acidic buffer has a pH in aqueous solution of about 1 to about 2.

In some embodiments, the aforementioned process which uses an acidic buffer for column regeneration, further comprises the steps of regenerating the column with a chaotropic reagent, kosmotropic agent, detergent and/or basic reagent, in at least some of the regeneration steps. Thus, the aforementioned process may further comprise the step of: (i) regenerating the chromatographic resin by contacting the resin with a composition comprising at least one chaotropic agent; (ii) regenerating the chromatographic resin by contacting the resin with a composition comprising at least one kosmotropic agent; (iii) regenerating the chromatographic resin by contacting the resin with a composition comprising at least one detergent; and/or (iv) regenerating the chromatographic resin by contacting the resin with a composition having a pH in aqueous solution of about 9 or higher, preferably about 10 or higher. Steps (i), (ii), (iii) and/or (iv) may be performed in at least 1% of the purification cycles, preferably in at least about 10% of the purification cycles, more preferably in at least about 25% of the purification cycles, and more preferably in at least about 50% of the purification cycles.

In another exemplary embodiment, the present invention provides a method for purifying a target molecule in a sample which involves intein-N column regeneration using a chaotropic agent. In accordance with this embodiment, the method comprises the steps of (a) providing a sample containing a fusion protein comprising an intein-C polypeptide joined to a target molecule by a peptide bond (intein-C tagged target molecule); (b) contacting the sample with a chromatography resin comprising a covalently-linked N-terminal intein polypeptide, under conditions in which the intein-C polypeptide in the fusion protein binds to the Intein-N polypeptide in the resin to form an intein complex; (c) optionally washing the resin containing the intein complex to remove unbound contaminants; (d) exposing the intein complex to conditions sufficient to release the target molecule from the intein-C polypeptide; (e) regenerating the chromatographic resin by contacting the resin with at least one chaotropic agent; and (f) optionally, performing at least one additional purification cycle by repeating steps (a) to (e) at least once. According to the principles of the present invention, the regenerated chromatography resin obtained from step (e) or optional step (f) retains at least about 60%, preferably at least about 70% and more preferably at least about 80% of its C-terminal intein binding capacity after each purification cycle.

In some embodiments, the aforementioned process which uses a chaotropic reagent for column regeneration, further comprises the steps of regenerating the column with a kosmotropic agent, detergent, acidic reagent, and/or basic reagent, in at least some of the regeneration steps. Thus, the aforementioned process may further comprise the step of: (i) regenerating the chromatographic resin by contacting the resin with a composition comprising at least one acidic reagent having a pH in aqueous solution of at least about 1 to about 4; (ii) regenerating the chromatographic resin by contacting the resin with a composition comprising at least one kosmotropic agent; (iii) regenerating the chromatographic resin by contacting the resin with a composition comprising at least one detergent; and/or (iv) regenerating the chromatographic resin by contacting the resin with a composition having a pH in aqueous solution of about 9 or higher, preferably about 10 of higher. Steps (i), (ii), (iii) and/or (iv) may be performed in at least 1% of the purification cycles, preferably in at least about 10% of the purification cycles, more preferably in at least about 25% of the purification cycles, and more preferably in at least about 50% of the purification cycles.

In another exemplary embodiment, the present invention provides a method for purifying a target molecule in a sample which involves intein-N column regeneration using a kosmotropic agent. In accordance with this embodiment, the method comprises the steps of (a) providing a sample containing a fusion protein comprising an intein-C polypeptide joined to a target molecule by a peptide bond (intein-C tagged target molecule); (b) contacting the sample with a chromatography resin comprising a covalently-linked N-terminal intein polypeptide, under conditions in which the intein-C polypeptide in the fusion protein binds to the Intein-N polypeptide in the resin to form an intein complex; (c) optionally washing the resin containing the intein complex to remove unbound contaminants; (d) exposing the intein complex to conditions sufficient to release the target molecule from the intein-C polypeptide; (e) regenerating the chromatographic resin by contacting the resin with a composition having at least one kosmotropic agent so as to disrupt the intein-N intein-C complex and release the intein-C polypeptide from the chromatography resin; and (f) optionally, performing at least one additional purification cycle by repeating steps (a) to (e) at least once. According to the principles of the present invention, the regenerated chromatography resin obtained from step (e) or optional step (f) retains at least about 60%, preferably at least about 70% and more preferably at least about 80% of its C-terminal intein binding capacity after each purification cycle.

In some embodiments, the aforementioned process which uses a kosmotropic reagent for column regeneration, further comprises the steps of regenerating the column with a chaotropic reagent, detergent, acidic reagent, and/or basic reagent, in at least some of the regeneration steps. Thus, the aforementioned process may further comprise the step of: (i) regenerating the chromatographic resin by contacting the resin with a composition comprising at least one acidic reagent having a pH in aqueous solution of at least about 1 to about 4; (ii) regenerating the chromatographic resin by contacting the resin with a composition comprising at least one chaotropic agent; (iii) regenerating the chromatographic resin by contacting the resin with a composition comprising at least one detergent; and/or (iv) regenerating the chromatographic resin by contacting the resin with a composition having a pH in aqueous solution of about 9 or higher, preferably about 10 of higher. Steps (i), (ii), (iii) and/or (iv) may be performed in at least 1% of the purification cycles, preferably in at least about 10% of the purification cycles, more preferably in at least about 25% of the purification cycles, and more preferably in at least about 50% of the purification cycles.

In another exemplary embodiment, the present invention provides a method for purifying a target molecule in a sample which involves intein-N column regeneration using a detergent. In accordance with this embodiment, the method comprises the steps of In another exemplary embodiment, the present invention provides a process a method for purifying a target molecule in a sample, by (a) providing a sample containing a fusion protein comprising an intein-C polypeptide joined to a target molecule by a peptide bond (intein-C tagged target molecule); (b) contacting the sample with a chromatography resin comprising a covalently-linked N-terminal intein polypeptide, under conditions in which the Intein-C polypeptide in the fusion protein binds to the intein-N polypeptide in the resin to form an intein complex; (c) optionally washing the resin containing the intein complex to remove unbound contaminants; (d) exposing the intein complex to conditions sufficient to release the target molecule from the intein-C polypeptide; (e) regenerating the chromatographic resin by contacting the resin with one or more compositions selected from the group consisting of a composition comprising at least one detergent; and (f) optionally, performing at least one additional purification cycle by repeating steps (a) to (e) at least once. According to the principles of the present invention, the regenerated chromatography resin obtained from step (e) or optional step (f) retains at least about 60%, preferably at least about 70% and more preferably at least about 80% of its C-terminal intein binding capacity after each purification cycle.

In some embodiments, the detergent is selected from the group consisting of anionic detergents, cationic detergents, non-ionic detergents and zwitter ionic detergents; preferably wherein the detergent is selected from the group consisting of polysorbates, polyethylene glycols, glycosides, poloxamers, CHAPS, CHAPSO, alkylbenzenesulfonates, quaternary ammonium salts and bile acids.

In some embodiments, the aforementioned process which uses a detergent for column regeneration, further comprises the steps of regenerating the column with a chaotropic reagent, kosmotropic agent acidic reagent and/or basic reagent, in at least some of the regeneration steps. Thus, the aforementioned process may further comprise the step of: (i) regenerating the chromatographic resin by contacting the resin with a composition comprising at least one acidic reagent having a pH in aqueous solution of at least about 1 to about 4; (ii) regenerating the chromatographic resin by contacting the resin with a composition comprising at least one chaotropic agent; (iii) regenerating the chromatographic resin by contacting the resin with a composition comprising at least one kosmotropic agent; and/or (iv) regenerating the chromatographic resin by contacting the resin with a composition having a pH in aqueous solution of about 9 or higher, preferably about 10 or higher. Steps (i), (ii), (iii) and/or (iv) may be performed in at least 1% of the purification cycles, preferably in at least about 10% of the purification cycles, more preferably in at least about 25% of the purification cycles, and more preferably in at least about 50% of the purification cycles.

In an alternative embodiment, the process of the invention comprises the following steps: (a) providing a chromatographic resin carrying an intein-N fragment; (b) attaching an intein-C fragment to a target of choice; (c) soluble or insoluble expression of the intein-C tagged target in an expression system of choice; (d) loading the intein-C tagged target from a cell culture to the intein Column, under conditions sufficient to form a stable complex between the intein-N fragment and the intein-C fragment; (e) washing the intein column under conditions to remove contaminants such as host cell proteins (HCPs); (f) optionally incorporating an intermediate wash to further remove process contaminants; (g) triggering the tagless release of the target under condition where the cleaved intein-C fragment stays associated with the intein-N fragment on the column; and (h) regenerating the column by introducing an electrostatic environment (with acidic buffer) and/or changes in the protein tertiary structure (with chaotropic agents, kosmotropic agents and/or detergents), so as to disrupt the intein-N and intein-C complex and regenerate the intein-N resin. Basic buffers can also be incorporated some of the regeneration cycles with periodicity to be determined by a person of skill in the art.

Acidic Buffers

In some embodiments, the pH of about 1 to 4 in regenerating step (e) is achieved by exposing the intein-N column to a buffer having an acidic pH in aqueous solution. In some embodiments, the buffer has a pH between about 1 and about 2 in aqueous solution. In other embodiments, the buffer has a pH of about 1 in aqueous solution. In other embodiments, the buffer has a pH of about 2 in aqueous solution. In some embodiments, the buffer has a pH between about 1 and about 3 in aqueous solution. In some embodiments, the buffer has a pH between about 1 and about 3.5 in aqueous solution. In some embodiments, the buffer has a pH between about 2 and about 3.5 in aqueous solution.

Non-limiting embodiments of acidic buffers include phosphoric acid ($H_3PO_4$), glycine, hydrochloric acid (HCl), hydrobromic acid (HBr), citric acid, acetic acid, formic acid, lactic acid, carbonic acid, succinic acid, nitric acid, malic acid, oxalic acid, salicylic acid, formic acid, and any combinations thereof.

Detergents

In one embodiment, the method described herein further comprises the step of washing the chromatography resin with a detergent and/or with water after the regeneration step, prior to reuse. The washing step can occur simultaneously with the regeneration step, or occur after the regeneration step, prior to reuse.

The term "detergent" as used herein refers to a composition comprising a surfactant or mixtures of surfactants with cleaning properties. The term "surfactant" as used herein refers to a surface-active agent, or a wetting agent, capable of reducing the surface tension of a liquid; typically organic compounds having a hydrophilic "head" and a hydrophobic "tail"

Suitable surfactants include cationic surfactants, anionic surfactants, amphoteric surfactants, zwitterionic surfactants, nonionic surfactants, and mixtures thereof. Non-limiting examples of detergents are selected from the group consisting of polysorbates, polyethylene glycols, glycosides, poloxamers, CHAPS, CHAPSO, alkylbenzenesulfonates, quaternary ammonium salts and bile acids.

Cationic surfactants include for example, cetyl trimethyl ammonium bromide, cetyl trimethyl ammonium chloride, and mixtures thereof.

Anionic surfactants include for example, alkyl benzene sulphonates, sodium dodecyl sulfate, sodium sulfosuccinate, sodium lauryl sulfate, an alkyl naphthalene sulfonate condensate sodium salt, sodium stearate, and mixtures thereof.

Amphoteric surfactants include various lecithins, such as egg lecithin, soya bean lecithin, synthetic saturated lecithins such as dimyristoyl phosphatidyl choline, dipalmitoyl phosphatidyl choline and distearoyl phosphatidyl choline, and synthetic unsaturated lecithins such as dioleyl phosphatidyl choline and dilinoleyl phosphatidyl choline. Nonionic surfactants include for example, ethoxylated sorbitan esters, sorbitan esters, polyglycerol esters, sucrose esters, poloxamers, alkyl polyglucosides, polyalkyleneoxide modified heptamethyltrisiloxanes, allyloxypolyethylene glycol methylethers and mixtures thereof. A currently preferred surfactant is sodium dodecyl sulfate (SDS).

Chaotropic Agents

A "chaotropic agent" as used herein is a molecule that that can disrupt the hydrogen bonding between water molecules. This affects the stability of the native state of other molecules in the solution, e.g., polypeptides and proteins, by weakening the hydrophobic effect. Non-limiting examples of chaotropic agents that can be used in the context of the present invention guanidinium chloride, arginine, n-butanol, ethanol, lithium perchlorate, lithium acetate, magnesium chloride, phenol, 2-propanol, sodium dodecyl sulfate, thiourea, urea, and any combination thereof.

Kosmotropic Agents

A "kosmotropic agent" as used herein stabilizes intramolecular interactions in macromolecules such as proteins. Kosmotropic agents can be ionic or nonionic. Ionic kosmotropes tend to be small or have high charge density. Some ionic kosmotropes are $CO_3^{2-}$, $SO_4^{2-}$, $HPO_4^{2-}$, and any combination thereof.

In some embodiments, the kosmotropic agent to be used in the method of the invention is an ionic kosmotropic agent or a nonionic kosmotropic agent selected from the group consisting of carbohydrates, amino acids and alcohols, and any combination thereof.

Basic Buffers

In some embodiments, the pH of about 9 or higher in optional regenerating step (e) (iv) is achieved by exposing the intein-N column to a buffer having a basic pH in aqueous solution. In some embodiments, the buffer has a pH between about 9 and about 14 in aqueous solution. In some embodiments, the buffer has a pH between about 10 and about 14 in aqueous solution. In some embodiments, the buffer has a pH between about 11 and about 14 in aqueous solution. In other embodiments, the buffer has a pH of between about 10 and about 12 in aqueous solution.

Suitable bases for use in such basic buffers include, but are not limited to, a base such as sodium hydroxide, potassium hydroxide, caustic cleaner, arginine, calcium hydroxide or potassium hydroxide.

Affinity Chromatography Matrices Comprising Intein-Ns

The process described herein utilizes intein-N polypeptides as ligands for affinity chromatography. Accordingly, the present invention, in certain embodiments, provides affinity chromatography matrices comprising an intein-N polypeptide attached to a solid support. In a particular embodiment, the solid support is a chromatography resin or chromatography membrane. In one embodiment, the chromatography resin includes a hydrophilic polyvinyl ether base.

Preferably the solid support compromises organic polymers like hydrophilic vinyl ether based polymer, polystyrene, polyether sulfone, polyamide, e.g., nylon, polysaccharides such as, for example, agarose and cellulose, polyacrylate, polymethacrylate, polyacrylamide, polymethacrylamide, polytetrafluoroethylene, polysulfone, polyester, polyvinylidene fluoride, polypropylene, polyethylene, polyvinyl alcohol, polycarbonate, polymer of a fluorocarbon, e.g., poly (tetrafluoroethylene-co-perfluoro (alkyl vinyl ether)), or combinations or copolymers thereof.

In yet other embodiments, the solid support comprises a support of inorganic nature, e.g., silica, zirconium oxide, titanium oxide and alloys thereof. The surface of inorganic matrices is often modified to include suitable reactive groups. In some embodiments, the solid support may, for instance, be based on zirconia, titania or silica in the form of controlled pore glass, which may be modified to either contain reactive groups and/or sustain caustic soaking, to be coupled to ligands.

Exemplary solid support formats include, but are not limited to, a bead (spherical or irregular), a hollow fiber, a solid fiber, a pad, a gel, a membrane, a cassette, a column, a chip, a slide, a plate or a monolith.

Any suitable technique may be used for attaching the intein-N described herein to a support, e.g., a solid support including those well-known in the art and described herein. For example, in some embodiments, the intein-N may be attached to a support via conventional coupling techniques utilizing, e.g., thiol, amino and/or carboxy groups present in the fragment. For example, bisepoxides, epichlorohydrin, CNBr, N-hydroxysuccinimide (NHS) etc., 1,4-Butanediol diglycidyl ether are well-known coupling reagents, and facilitate the chemical coupling of the intein-N fragment to the solid support. Other coupling agents can be used as known in the art. For a review of coupling methods used to this end, see e.g., Immobilized Affinity Ligand Techniques, Hermanson et al., Greg T. Hermanson, A. Krishna Mallia and Paul K. Smith, Academic Press Inc., 1992, the contents of which are hereby incorporated in their entirety. As well known in the field, parameters such as ligand density or substitution level, pore size of the support etc. may be varied to provide a chromatography resin having desired properties.

Choosing the appropriate conditions for coupling a protein ligand to a solid support is well within the capability of the skilled artisan. Suitable buffers for this process include any non-amine containing buffer such as carbonate, bicarbonate, sulfate, phosphate and acetate buffers. The buffers may further include salts which may be in the range of 5 nM-100 mM.

In some embodiments, the reaction is performed at a temperature ranging from 0° C. to 99° C. In certain embodiments the reaction method is practiced at a temperature less than 60° C., less than 40° C., less than 20° C., or less than 10° C. In some embodiments the method of the invention is practiced at a temperature of about 4° C. In other embodiments the method of the invention is practiced at a temperature of 20° C.

Preparation of Intein-C Fusion Proteins

The method of the invention involves the preparation of intein-C tagged target molecule (e.g., a protein). Intein-C tagged molecules can be prepared by attaching an intein-C polypeptide to a target molecule to obtain a fusion protein, and expressing the fusion protein in an expression system. Methods of preparing fusion, or chimeric, proteins are well known in the art including, but not limited to, standard recombinant DNA techniques. For example, DNA fragments coding for different protein sequences (e.g., a C-intein and a target molecule) are ligated together in-frame in accordance with conventional techniques. In another embodiment, the fusion gene can be synthesized by conventional techniques including automated DNA synthesizers. Alternatively, PCR amplification of nucleic acid fragments can be carried out using anchor primers that give rise to complementary overhangs between two consecutive nucleic acid fragments that can subsequently be annealed and re-amplified to generate a chimeric nucleic acid sequence (see Ausubel et al., Current Protocols in Molecular Biology, 1992, the contents of which are incorporated by reference in their entirety). Moreover, many expression vectors are commercially available that already encode a fusion moiety (e.g., a GST moiety, an Fc moiety).

Preferably, the fusion protein is expressed from an encoding nucleic acid in transiently or stably transfected or transformed prokaryotic or eukaryotic host cells or organisms. Common host cells or organisms for expression of recombinant proteins include, for example, *Escherichia coli, Corynebacterium glutamicum, Pseudomonas fluorescens, Lactococcus lactis, Pichia pastoris, Saccharomyces cerevisiae, Zea* maize, Nicotinia *tabacum, Daucus carota*, SF9 cells, CHO cells (e.g., CHO DG44 cells, CHO DXB11 cells), NS0 cells, HEK 293 cells, and whole animals such as cows and goats. In an embodiment, the C-intein-target fusion protein is expressed in *E. coli*. The expressed fusion protein can then be purified away from contaminating cellular proteins using conventional separation and chromatographic methods, such as clarification by depth filtration, purification by anion and cation exchange chromatography, and concentration by ultrafiltration.

In some embodiments, the intein polypeptide (e.g., C-intein) and target protein are linked directly via a peptide bond. In other embodiments, the fusion protein includes a spacer, or linker, molecule between the intein polypeptide (e.g., C-intein) and the target molecule. Suitable spacer/linker molecules are known in the art.

Affinity Purification

In some embodiments, step (b) of the method of the invention comprises contacting the chromatography resin with a cell culture supernatant comprising the intein-C tagged target molecule. Thus, in some embodiments, step (b) comprises loading the intein-C tagged target molecule in a saline buffer having a pH of about 8 to about 10.

Conditions under which the C-intein polypeptide in the fusion protein selectively binds to the chromatography bound N-intein polypeptide to form an intein complex can vary depending on the inteins used and can be determined by one of ordinary skill in the art. Exemplary binding conditions include a) a temperature in the range of about 4-25° C., and a buffer comprising 100 mM Tris-HCl, 25 mM NaCl, 0.1 mM zinc chloride, pH=9; b) a temperature in the range of about 4-25° C., and a buffer comprising 50 mM NaAc, 0.5 M NaCl, pH=5; c) a temperature in the range of about 4-25° C., and a buffer comprising 0.5 M NaCl, 10 mM Tris-HCl, pH=8; d) a temperature in the range of about 4-25° C., and a buffer comprising 100 mM Tris, 200 mM NaCl at pH 9; e) a temperature in the range of about 4-25° C., and a buffer comprising 100 mM Tris and 100 mM NaCl at pH 7; and f) a temperature in the range of about 4-25° C., and a buffer comprising 100 mM Tris and 200 mM NaCl at pH 7.

In optional step (c), the loaded column may then be washed to remove unbound and weakly-bound contaminants using a wash buffer. The washing buffer preferably comprises a detergent (e.g., Triton X100, ND40), a salt (e.g., acetate, phosphate, chloride, sulfate salts of sodium, ammonium, or potassium), a chaotropic agent, preferably urea or arginine, or a combination thereof.

Subsequently, in step (d), the resin is contacted with a cleavage buffer having a pH of about 6 to about 8 (e.g., 100 mM Tris, 200 mM NaCl, pH=7), so as to release the target molecule from the intein-C polypeptide. The target molecule is then recovered in the eluate.

The column is then regenerated in step (e) as described above, and then optionally washed with water concurrently or subsequently to the regeneration step, and prior to reuse.

The present subject matter described herein will be illustrated more specifically by the following non-limiting examples, it being understood that changes and variations can be made therein without deviating from the scope and the spirit of the disclosure as hereinafter claimed. It is also understood that various theories as to why the disclosure works are not intended to be limiting.

EXAMPLES

The following are examples that illustrate embodiments for practicing the disclosure described herein. These examples should not be construed as limiting.

Example 1: Materials and Methods

Expression of Intein-Fused Protein Genes in *E. coli*

Intein-C targets were produced in a bioreactor batch, growth conditions: 3 h, 30° C. Intein-N Ligands were produced under growth conditions: 20 h, 20° C., flask format. 100 mL 2×YT medium (Merck kGaA) were inoculated with 100 μl kanamycin stock solution (30 mg/ml) and 2 mL of a pre-culture. The main-cultures were grown at 20-30° C. and 200-500 rpm. Induction at 0.12 mM Isopropyl β-D-1-thiogalactopyranoside (IPTG) end concentration took place at an OD600 value of 2. The main cultures were cultivated for 3 or 20 hours. Cells were harvested by centrifugation, the supernatant was discarded, and pellets were stored below −20° C.

Cell Lysis:

Biomass was lysed by chemical or mechanical cell lysis. Intein-C tagged (IC) targets were lysed by mechanical cell lysis while chemical cell lysis was used for intein-N (IN) ligands.

Mechanical cell disruption was carried out by suspending cells in 10 mL Mechanical Lysis Buffer (100 mM Tris, 150 mM NaCl, 5 mM $MgCl_2$ and 25 U/ml Benzonase®, pH 8-9). The cell solution was transferred into a cell disruption chamber and cell disruption was accomplished at 1 kbar. The supernatant (lysate) was centrifuged at 4° C., 18000 rcf for 25 minutes. After the centrifugation, the supernatant was filtered and used as clarified *E. coli* cell lysate (CL) for further purification step (e.g., intein-C target *E. coli* lysate below).

Chemical cell lysis was carried out by suspending cells in, 10 mL Chemical Lysis Buffer (50 mM Tris, 5 mM $MgCl_2$, 1:10 CelLytic B cell lysis Reagent, 25 U/mL Benzonase®, pH 8) The mix was vortexed and centrifuged. After the centrifugation, the supernatant was filtered was used as clarified *E. coli* cell lysate for further purification step.

StrepII-Tag Based Purification Method

An affinity column packed with Strep-Tactin® Superflow HC was equilibrated with 2 column volume (CV) Strep-Binding Buffer (100 mM tris, 200 mM NaCl, pH 9 for intein-C targets; and 100 mM Tris, 150 mM NaCl and 1 mM EDTA, pH 8 for intein-N ligands). The clarified feed (clarified *E. coli* cell lysate described above) was loaded to the column, unbound protein was washed through the column with Strep-Binding Buffer and bound target was eluted with Strep-Elution Buffer (100 mM Tris, 200 mM NaCl and 2.5 mM d-Desthiobiotin, pH 9 for intein-C targets; and 100 mM Tris, 150 mM NaCl, 1 mM EDTA, 1 mM TCEP and 2.5 mM d-Desthiobiotin, pH 8 for intein-N ligands). The column was regenerated by eluting of remaining protein with Strep-Regeneration Buffer (50 mM Tris, 150 mM NaCl, 1 mM 4'-hydroxyazobenzene-2-carboxylic acid (HABA), 1 mM EDTA, pH 8). After another column wash with 100 mM Tris Buffer, the column was re-equilibrated with 2CV in Strep-Binding Buffer.

Dialysis and Intein-N/Resin Coupling Reaction

StrepII-tagged and purified intein-N ligand was injected into Dialysis Cassettes. Cassettes were transferred into a beaker containing Coupling Buffer (100 mM $Na_2CO_3$/$NaH_2$—$CO_3$, 1 mM TCEP, pH 10). Dialysis was performed at 4° C. overnight. Dried Epoxy-BDM resin was swollen using 2 mL of Coupling Buffer without reducing agents to achieve a 1 ml column size. The swelled resin was sucked dry. Dialysed intein-N ligand was then transferred to the swelled resin. The resin was incubated in a 1:3 relation (v/v) to the Intein-N ligand Stock for 2.5 hr.

Production of proteins of the expected size was confirmed using SDS polyacrylamide electrophoresis (SDS Page) as known in the art. The amount of covalently bound ligand was determined through a BCA assay as known in the art.

Static Binding Capacity of Intein-N Resin.

The static binding capacity of the resin was measured according to the Scheme of FIG. 1. Thus, 50% bulk of immobilized intein-N resin was transferred into centrifuge filters. The resin was washed with double-distilled $H_2O$ (dd$H_2O$). For NaOH or $H_3PO_4$ stability screening, a 10% resin slurry was centrifuged, the supernatant was discarded and replaced with 0.14 or 0.7 M NaOH (for analyzing stability in 0.1 or 0.5 M NaOH) or with 0.21 M $H_3PO_4$ (for analyzing stability in 0.15 M $H_3PO_4$). The resins were shaken and centrifuged again and the pellet was washed with saline buffer at pH 7.

10 μl of immobilized resin was transferred in a well of a 96-well filter plate. The resin was equilibrated twice in Capture Buffer (100 mM Tris, 200 mM NaCl pH 9) for 5 min. The supernatant was discarded. 200 μl intein-C target solution with 1 mg/mL was incubated with the resin for 1 h. The supernatant was then collected in a 96-well UV plate using vacuum. The Resin was incubated with Capture Buffer for 15 min and subsequently Cleavage Buffer (100 mM Tris, 200 mM NaCl, pH 7). After washing, the resin was regenerated for at least 15 minutes with the CIP 1 (10 mM glycine) or CIP 2 (150 mM $H_3PO_4$) buffer (each having a pH of 1-2). The absorbance at 280 nm was measured for all collected fractions and the static binding capacity was calculated using the extinction coefficient of the intein-C target or the cleaved target. Besides a non-immobilized resin control, the A280-Absorbance was normalized through the specific absorbance of the different process buffers and the unspecific binding of the intein-C target at the resin.

Exemplary samples of the used intein-C target stock(S) and the CIP fractions were analyzed by SDS-Page. Therefor, 40 μl sample were incubated with 20 μl Denaturation Solution for 10 min at 95° C. Samples were analyzed by SDS-Page for determination of purification yield, coupling yield and ligand density, using SDS-Page and BCA assay technologies known in the art.

Functionality Tet: Dynamic Binding Capacity

For testing, the Intein-N ligand carrying resin in a dynamic column process, the Intein purification method described below was conducted with packed 1 mL Intein-N resin prototype columns.

Purification Method: The resin was equilibrated with 10 CL Capture Buffer. A sample size of 5-10 CV of an 1 mg/mL intein-C target solution that was pre-purified using StrepII-Tag purification as described above or an intein-C target containing clarified *E. coli* feed (mechanical cell lysis, as described above) was loaded to the column. The column was washed with Capture Buffer (pH 9) and bound intein-C target was released triggered by pH reduction with Cleavage Buffer (pH 7). The Column was then cleaned from remaining intein-C fragments using CIP 1 Solution (10 mM glycine) and CIP 2 Solution (150 mM $H_3PO_4$), at pH 1-2. The column was then re-equilibrated with Capture Buffer. After the purification step, the A280-Absorbance was calculated for all fractions with the chromatography software to check the amount of the eluted protein in each fraction. Under consideration of the A280-Absorbance and the extinction coefficient of the target, the concentration of the eluate and CIP fractions were determined. Samples were analyzed by SDS-Page for determination of purification yield, coupling yield and ligand density, using SDS-Page and BCA assay technologies known in the art. Exemplary feed(S), elution (E1 or E2) and CIP samples were analyzed using Size exclusion chromatography according to their purity.

Figure 2:
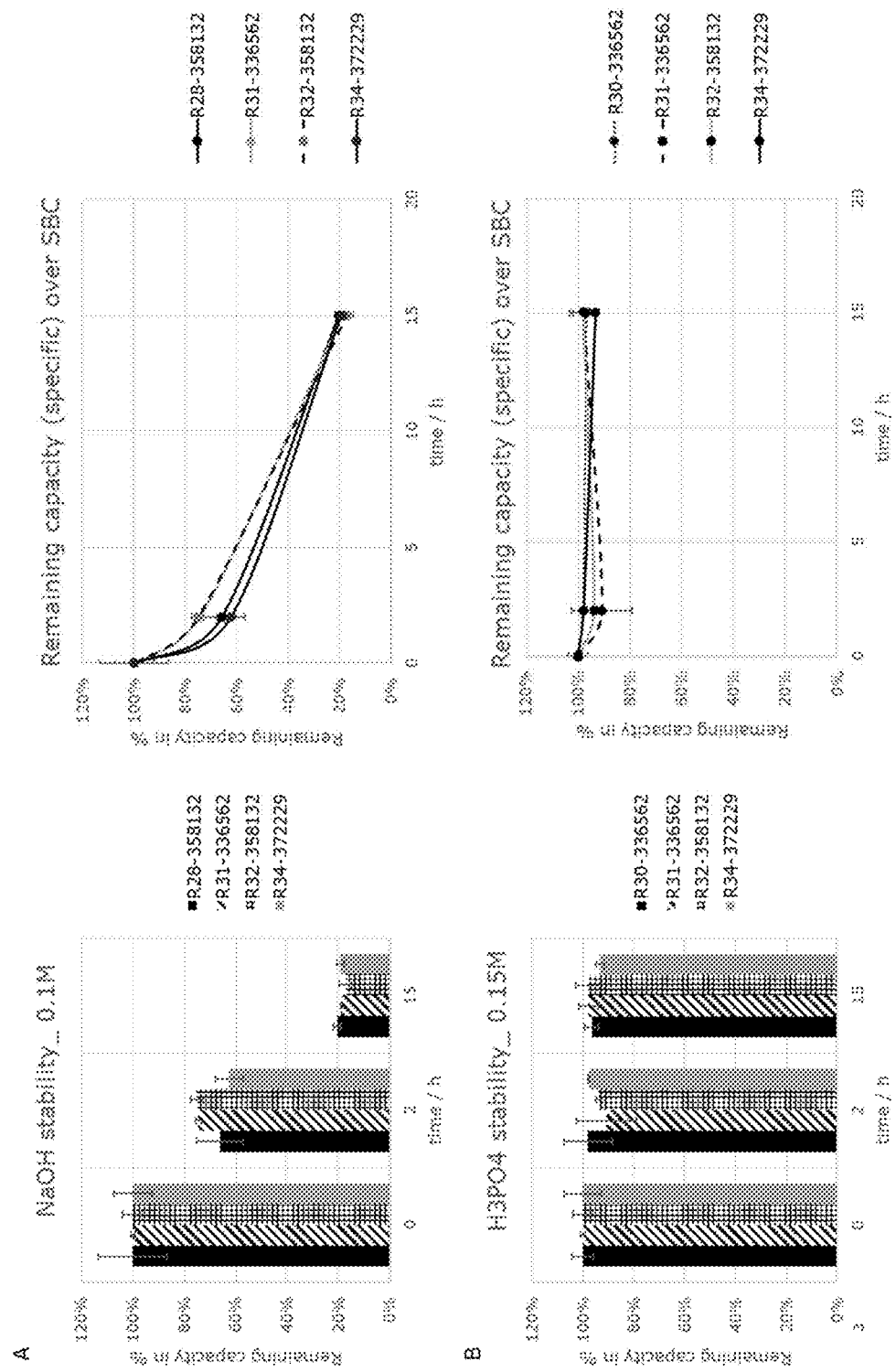
FIG. 2: Shows Static Binding Capacity (SBC) results of several intein-N ligand resin prototypes that were treated for 0/2/15 h with 0.1 M NaOH (A) or 0.15M $H_3PO_4$ (B). Pre-purified intein-C target was incubated with equilibrated resin and washed with a buffer at pH 9. The bound target was released triggered by two Regeneration Buffers (first: 0.01M Glycine, pH 1 second: 0.15 M $H_3PO_4$, pH 1.5).

Example 2: Stability of SBC of Intein-N Immobilized Resin in 0.1 M NaOH and 0.15 $H_3PO_4$ Several different intein-N ligand chromatography resins (R28-358132, R30-336562, R31-336562, R32-358132, R34-372229) were used for static binding capacity assay in high throughput format. The remaining static binding capacity after incubation in process buffers was determined. A 10% resin bulk was incubated for 0/2/15 h in 0.1 M NaOH and 0.15 M $H_3PO_4$ under shaking conditions at room temperature (RT). The resin was washed with Cleavage Buffer (100 mM Tris, 200 mM NaCl, pH 7) and was transferred to a 96-well filter plate. A sample size of 10 µl resin was equilibrated in Capture Buffer (100 mM Tris, 200 mM NaCl, pH 9). A pre-purified StrepII-tagged intein-C target (20 kDa) solution with 1 mg/mL protein, prepared as described in Example 1 was loaded for 1 h to the resin under shaking conditions. Unbound intein-C target was washed out with Capture Buffer (100 mM Tris, 200 mM NaCl, pH 9) and the resin was regenerated using acidic solutions with pH between 1-2 containing $H_3PO_4$ or Glycine. The breakthrough and CIP fractions were collected in 96-well UV plates, and the protein amount of the fractions and binding capacity of several intein-N ligand immobilized resins was calculated using the absorbance at 280 nm and the extinction coefficient of the target. The remaining static binding capacity of the resins that were incubated in different solutions for different time periods were calculated and are shown in FIG. 2. Exemplary results are quantified in Table 1.

TABLE 1

Static Binding Capacity (SBC) Study with several chromatography resins containing immobilized third generation Intein-N ligands.

| Resin | Total SBC at t = 0 h (mg/mL) | Time (h) | Remaining SBC after 0.1M NaOH Treatment (%) | Standard Deviation (%) | Remaining SBC after 0.15M H3PO4 Treatment (%) | Standard Deviation (%) |
|---|---|---|---|---|---|---|
| R28-358132 | 1.3 | 0 | 100.0% | 13.4% | 100.0% | 13.4% |
|  |  | 2 | 66.0% | 9.1% | 80.8% | 5.5% |
|  |  | 15 | 20.4% | 1.4% | 101.0% | 1.1% |
| R30-336562 | 1.4 | 0 | 100.0% | 4.1% | 100.0% | 4.1% |
|  |  | 2 | 82.6% | 3.8% | 98.0% | 9.6% |
|  |  | 15 | 32.5% | 1.1% | 96.6% | 2.7% |
| R31-336562 | 1.6 | 0 | 100.0% | 0.9% | 100.0% | 0.9% |
|  |  | 2 | 74.5% | 1.1% | 90.8% | 11.7% |
|  |  | 15 | 18.9% | 0.1% | 97.9% | 3.9% |
| R32-358132 | 1.72 | 0 | 100.0% | 3.8% | 100.0% | 3.8% |
|  |  | 2 | 75.2% | 2.4% | 93.7% | 1.0% |
|  |  | 15 | 17.2% | 2.3% | 97.9% | 5.2% |
| R34-372229 | 3.06 | 0 | 100.0% | 7.5% | 100.0% | 7.5% |
|  |  | 2 | 62.4% | 5.4% | 97.8% | 0.4% |
|  |  | 15 | 19.3% | 1.4% | 93.2% | 1.6% |
| 17RSDZ063 (Bead) | — | 0 | 102.2 | — | — | — |
|  |  | 8 | 90.8 | — | — | — |
|  |  | 15 | 99.1 | — | — | — |

The SBC values are shown in total at time (t=0) and in percentage of SBC (t=x)/SBC (t=0). As seen, there is a drastic decrease in capacity proportional to the incubation in 0.1 M NaOH, in contrast to a constant capacity in 0.15M $H_3PO_4$ storage. The control (17RSDZ063) was uncoupled resin bead.

FIG. 2 shows normalized SBC results of several intein-N ligand resin prototypes (R28-358132, R30-336562, R31-336562, R32-358132, R34-372229) that were treated for 0/2/15 h with 0.1 M NaOH (A) or 0.15M $H_3PO_4$ (B). The SBC of resin were measured at least with a triplicate. 200 µl of a pre-purified intein-C target (20 kDa) was incubated with equilibrated resin and washed with Capture Buffer (100 mM Tris, 200 mM NaCl, pH9). The bound target was released triggered by two Regeneration Buffers (first: 0.01M Glycine, pH 1 second: 0.15 M $H_3PO_4$, pH 1.5). The SBC of 2-3 mg/mL decreased to 60% (2 h) or 20% (15 h) with 0.1M NaOH treated resins. In contrast, the SBC values of 0.15 M $H_3PO_4$ treated resins were stable for 15 h at 100%.

Example 3: Stability of the Dynamic Capacity-Reuse of Intein Resin for Target Purification with Pre-Purified IC-Target An exemplary chromatography prototype column containing a third generation of intein-N ligand (R43-358132)

was reused in a 4× cycle reuse study for target release under dynamic bind and elute conditions. The intein-N resin was equilibrated with Capture Buffer at pH 9. The StrepII-tagged intein-C target was purified from a clarified E. coli lysate as described in Example 1. The pre-purified intein-C target in Strep-Elution Buffer (100 mM Tris, 200 mM NaCl, pH 9) was loaded onto the intein column. The unbound proteins were washed out with 10 CV Capture Buffer (100 mM Tris, 200 mM NaCl, pH9) and the cleavage process leading to a release of the tagged target was triggered through a change of the pH value to pH 7. The chromatography column was regenerated using acidic solutions with pH between 1-2 containing for example 0.15 M $H_3PO_4$.

Figure 3:
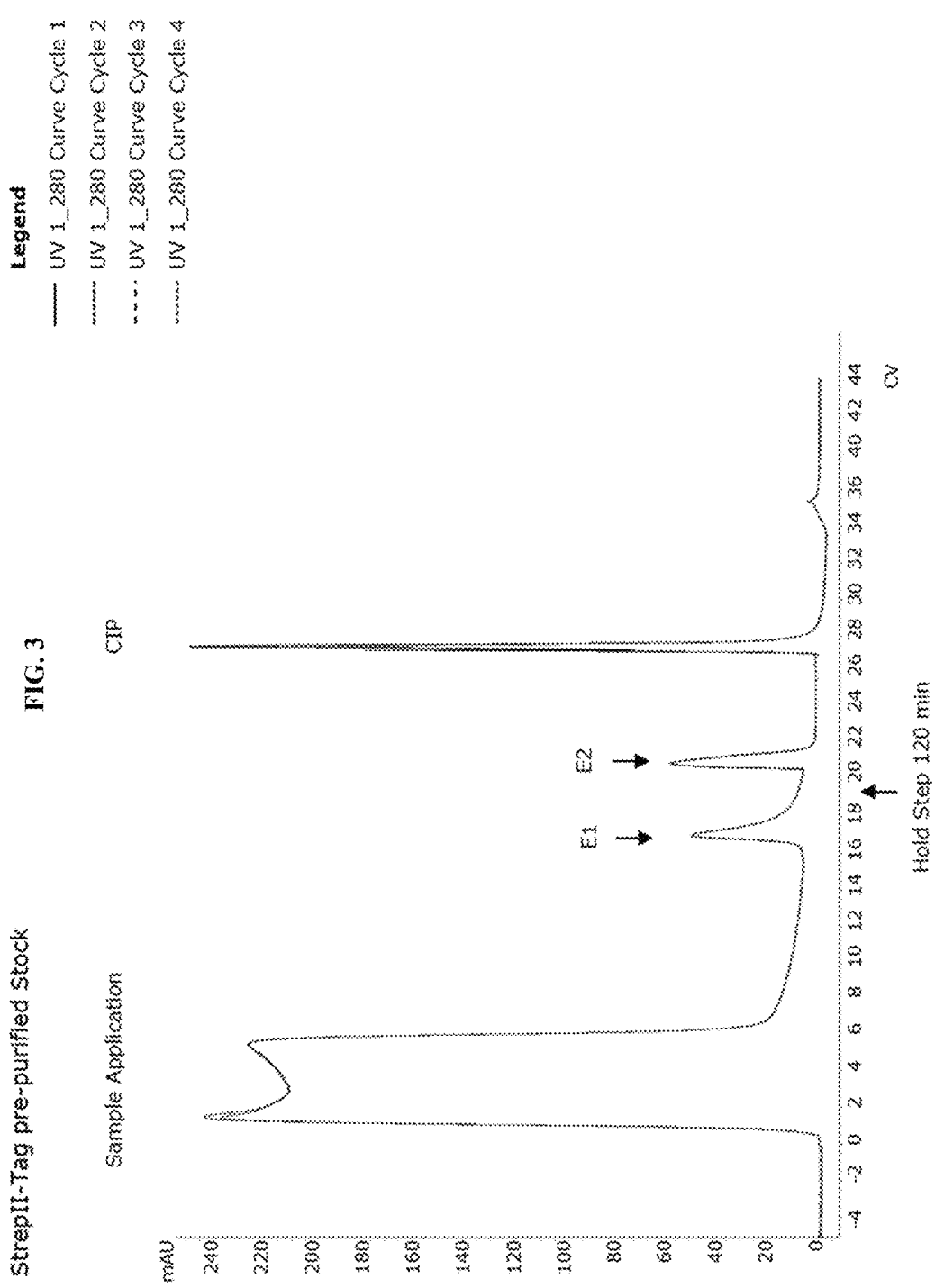
FIG. 3: Overlay of the absorbance measured at 280 nm (A280) chromatogram of a prototype R43-358132, carrying an immobilized third generation intein-N ligand. The column was loaded for 5 cycles with intein-C tagged target (20 kDa). The column was washed with buffer at pH 9 and elution of the cleaved target was triggered by a change to pH 7. After elution, the column was washed at pH 9 and cleaned with Regeneration Buffer (0.15M $H_3PO_4$ pH 1.5) to trigger release of intein-C. After cleaning the column was re-equilibrated using buffer at pH 9 and was subjected to the next round of reuse.
Figure 4:
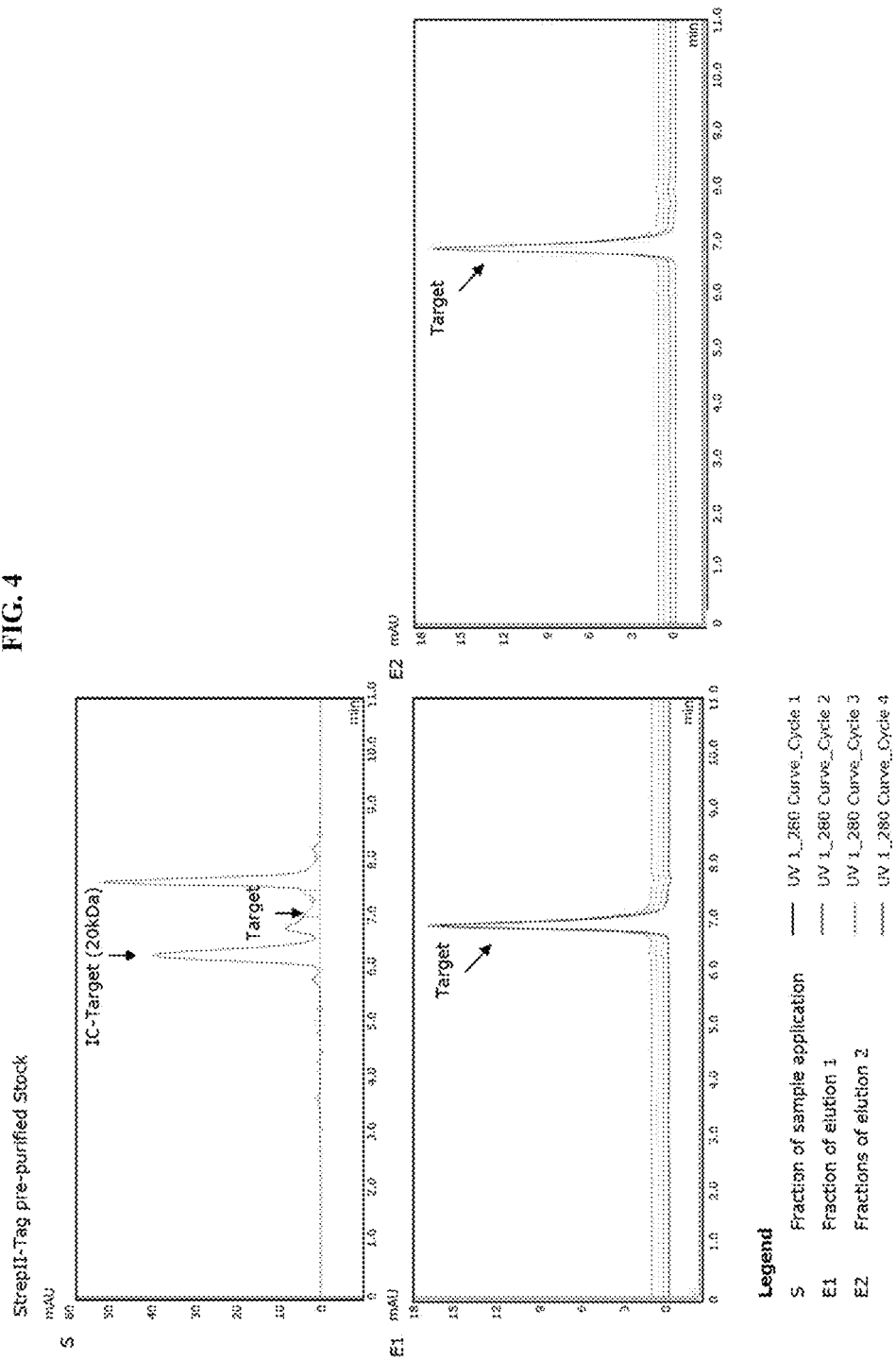
FIG. 4. The top graph(S) shows the size exclusion chromatogram of the StrepII-Tag pre-purified target (20 kDa) with a purity of 43% and the pre-cleaved tagless target with 3% purity. This stock was loaded to an intein-N ligand prototype R43-358132 for column performance evaluation. Graphs E1 and E2 show an overlay of four size exclusion chromatograms with the elution fractions of the reuse cycle studies of the intein purification. The samples were analyzed according to the purity of the released target.

The A280-Absorbance chromatogram for each round of column reuse was to create an overlay (FIG. 3). FIG. 3 depicts overlay of the absorbance measured at 280 nm (A280) Chromatogram of a prototype carrying an immobilized third generation intein-N ligand (R43-358132). The Column was loaded for 4 cycles with 5CV of c=1 mg/mL Intein-C tagged target (20 kDa). The column was washed with Capture buffer (100 mM Tris, 200 mM NaCl pH9), and elution of the cleaved target was triggered by a change in the pH with the use of 1 Cleavage Buffer (100 mM Tris, 200 mM NaCl pH7). After elution, the column was washed with Equilibration Buffer (100 mM Tris, 200 mM NaCl pH 9) and cleaned with Regeneration Buffer (0.15M $H_3PO_4$ pH 1.5) to trigger release of intein-C. After cleaning the column was reequilibrated using Capture buffer (100 mM Tris, 200 mM NaCl pH9) and the column was subjected to the next round of reuse. As shown, the dynamic binding capacity (DBC) stays consistent between 1-1.3 mg/mL for each round of column use. The amount of target that is cleaved during each elution phase stays consistent between 0.5-1.2 mg using the 20 kD test molecule. The purity from the elution fractions was recorded using A280-Absorbance showed a consistent target purity of 95-98% (FIG. 4).

Table 2 shows the calculated purities of the elution fractions (E1 and E2) that were collected during four reuse cycles of intein-based purification using intein-N prototype (R43-358132) column. Purities were determined by size exclusion chromatography (SEC).

TABLE 2

Purity of eluted target of two consecutive intein purification runs, using intein-N prototype resin column (R43-358132) and pre-purified intein-C target, determined by size exclusion chromatography.

| Cycle | Purity Rel. Area %- Target E1 | Purity Rel. Area %- Target E2 |
| --- | --- | --- |
| 1 | 95.8 | 97.4 |
| 2 | 95.8 | 97.5 |
| 3 | 94.3 | 98.2 |
| 4 | 94.9 | 97.6 |

Figure 5:
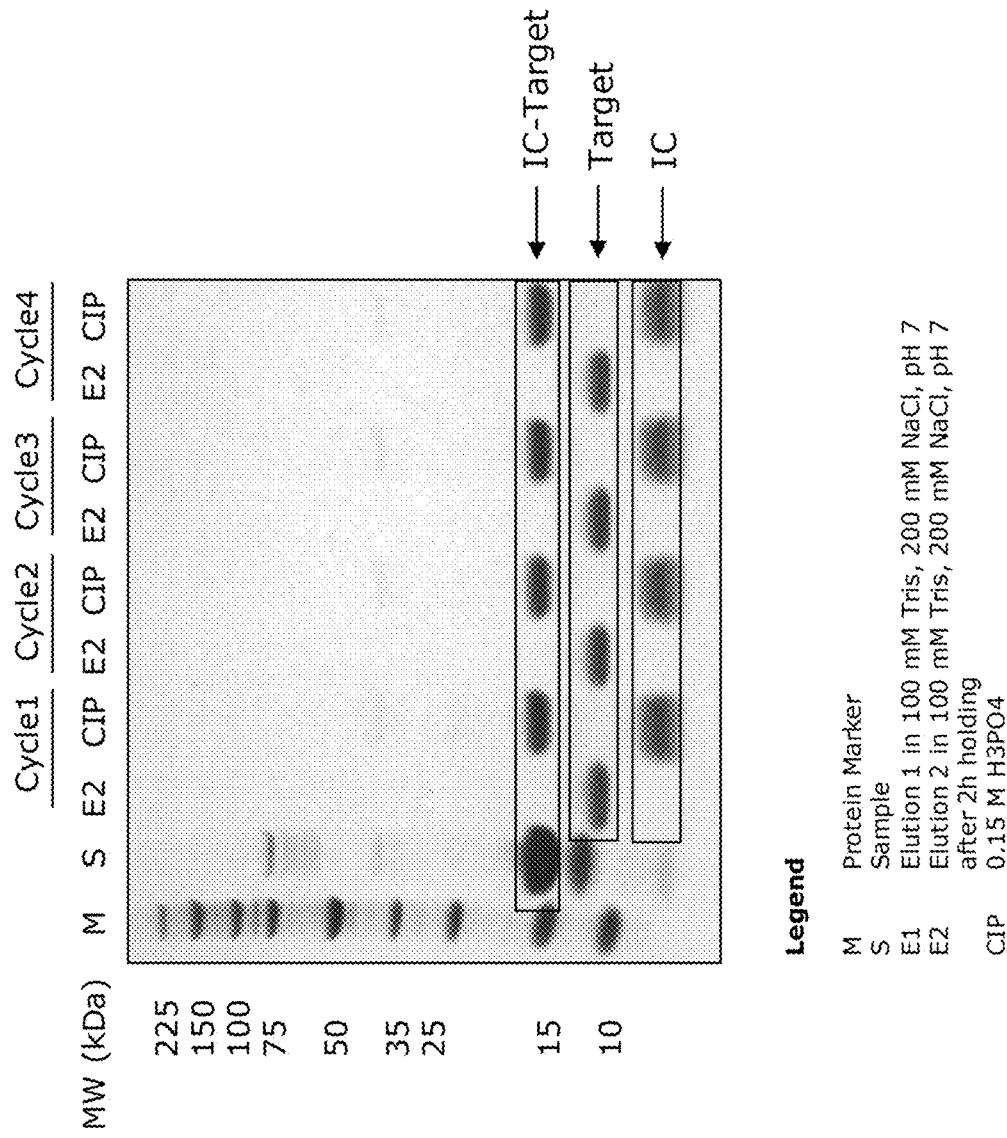
FIG. 5: SDS-Page intein-Purification of StrepII-tagged pre-purified intein-C target stock after StrepII-Tag Purification that was used as load to the intein-N ligand prototype R43-358132 (S). Elution fractions (E1 and E2) for all 4 cycles of reuse (Cycle 1-5) was loaded for SDS-Page analysis.

A sample size of the pre-purified intein-C target stock, the elution (E1, E2) and the cleaning (CIP) fractions were mixed and analyzed by SDS-Page chromatography. The results are shown in FIG. 5. FIG. 5 depicts SDS-Page intein-Purification visualizing the band composition of StrepII-tagged pre-purified intein-C target stock after StrepII-Tag Purification that was used as load to the intein-N ligand prototype R43-358132 (S). A sample of elution fractions (E1 and E2) for all 4 cycles of reuse (Cycle 1-4) was loaded for SDS-Page analysis. As shown, the protein amount in the elution fractions, the concentration separation of intein-C target (20 kDa), tagless target (11 kDa) and intein-C could be observed in every cycle in a similar amount, thus confirming the utility of a 0.15M $H_3PO_4$ pH 1.5 in regenerating intein columns under these conditions.

Example 4: Stability of the Dynamic Capacity—Reuse of Intein Resin for Target Purification with Clarified E. coli Lysate The reusability of an exemplary chromatography column prototype containing a third generation of intein-N ligand (R43-358132) was transferred to evaluate the intein-N column performance using a clarified E. coli lysate containing an intein-C tagged target protein (20 kDa). The reusability of the column was shown for at least 4 cycles of lysate load, target release and resin regeneration with acidic solutions at pH 1-2. The intein-N resin was equilibrated in saline buffer at pH 9. Intein-C target expressing E. coli was prepared as described in Example 1 (mechanical cell lysis). The clarified E. coli lysate that contained ~2 mg/mL intein-C Target was loaded after clarification using a 0.22 μm PVDF membrane to the column. The remaining lysate content was washed out with at Capture Buffer (100 mM Tris, 200 mM NaCl, pH 9) and the tagless target protein was released by reducing the pH value to pH 7. The elution phase was separated in a direct flow through elution with additional buffer. The column was regenerated with at least 5 CV of acidic solutions containing for example 0.15 M $H_3PO_4$.

Figure 6:
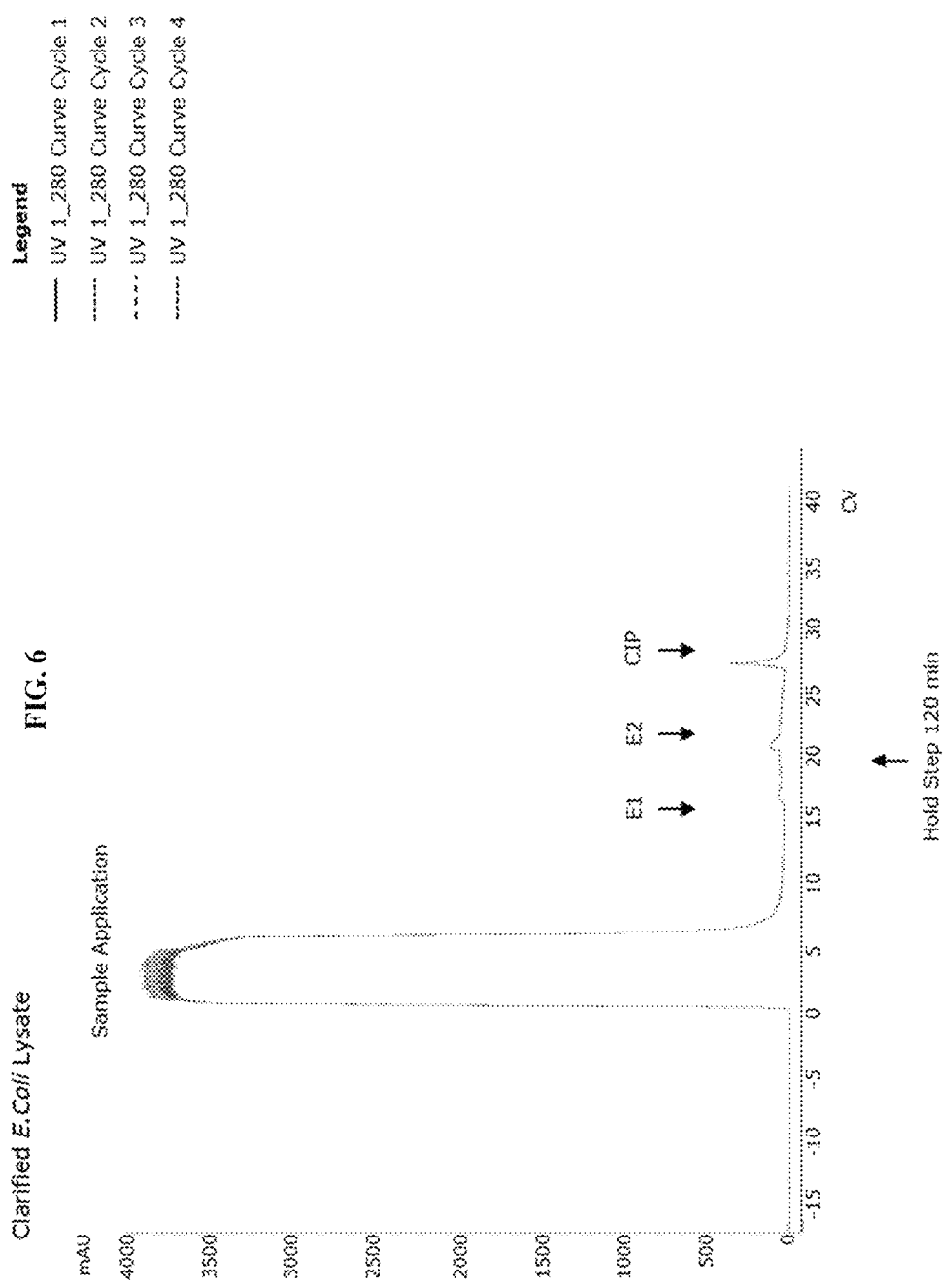
FIG. 6 Overlay of the absorbance measured at 280 nm (A280) chromatogram of a prototype R43-358132, carrying an immobilized third generation intein-N ligand. The column was loaded for 4 cycles with E. coli Lysate containing intein-C tagged target (20 kDa). The column was washed with buffer at pH 9 and elution of the cleaved target was triggered by a change to pH 7. After elution, the column was washed at pH 9 and cleaned with Regeneration Buffer (0.15M $H_3PO_4$ pH 1.5) to trigger release of intein-C. After cleaning the column was re-equilibrated using buffer at pH 9 and subjected to the next round of reuse.

The constant level of eluted target amount and dynamic binding capacity of the prototype R43-358132 was shown in both cycle studies. The total elution amount of every single reuse cycle was determined by A280-Absorbance and is shown in FIG. 6, which depicts an overlay of the absorbance measured at 280 nm (A280) chromatogram of a prototype resin named R43-358132 carrying an immobilized third generation intein-N ligand. The column was loaded for 4 cycles with 5CV of E. coli lysate containing ~2 mg/mL intein-C tagged target (20 kDa) for a complete saturation of the resin. The column was washed with Capture buffer (100 mM Tris, 200 mM NaCl pH9), and elution of the cleaved target was triggered by a change in the pH with the use of Cleavage Buffer (100 mM Tris, 200 mM NaCl pH7). After elution, the column was washed with Capture Buffer and cleaned with Regeneration Buffer (0.15M $H_3PO_4$ pH 1.5) to trigger release of intein-C. After cleaning the column was requilibrated using 10CV of Capture buffer (100 mM Tris, 200 mM NaCl pH9) and the column was subjected to the next round of reuse.

Figure 7:
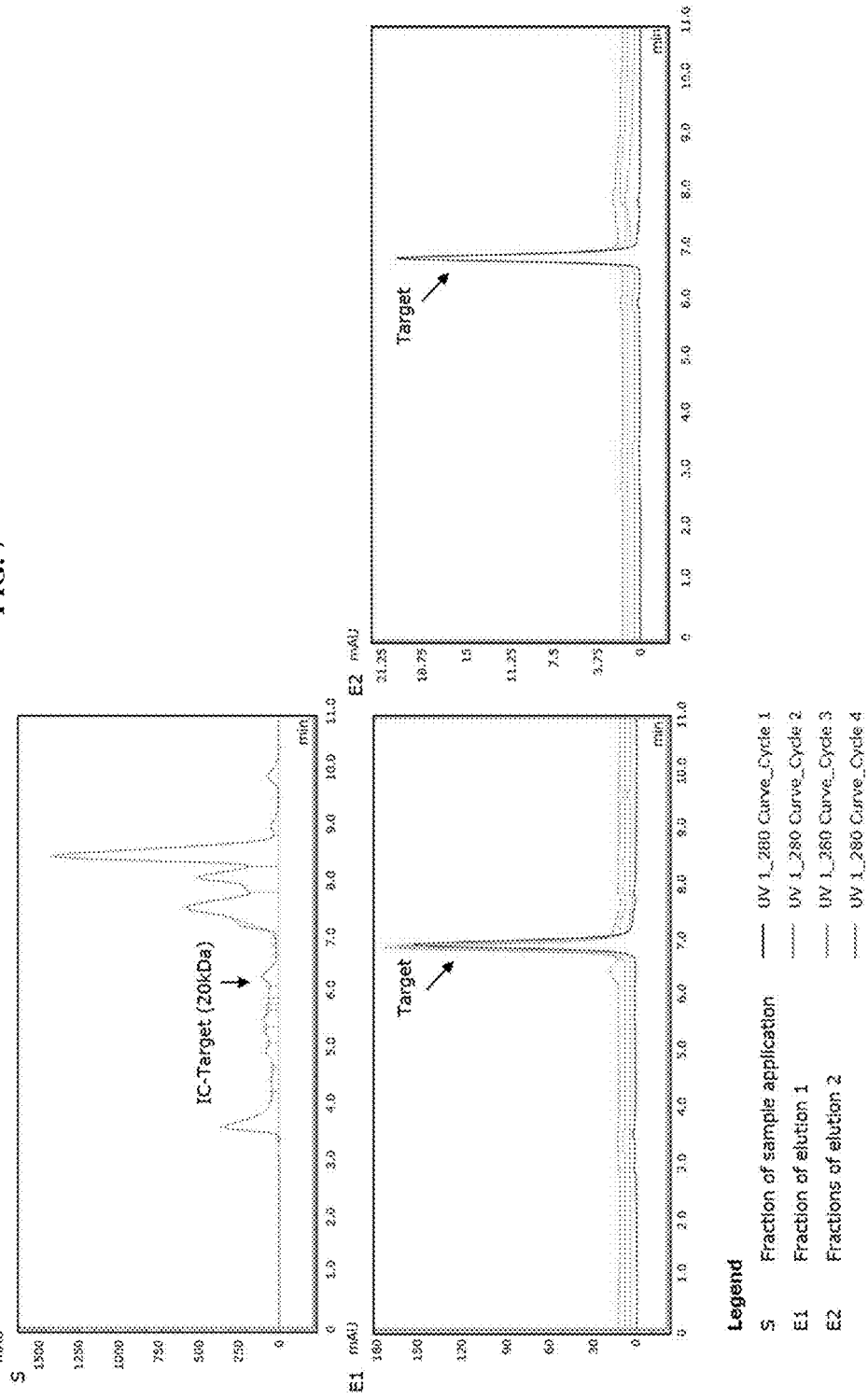
FIG. 7: The top graph(S) shows the size exclusion chromatogram of the clarified cell lysate containing the intein-C target protein (20 kDa) with a measured purity of 3%. This stock was loaded to an intein-N ligand prototype R43-358132 for intein column performance evaluation Graphs E1 and E2 show an overlay of five size exclusion chromatograms with the elution fractions of the reuse cycle studies of the intein purification. The samples were analyzed according to the purity of the released target.

The purity of the released target came to 70-93%. Table 3 shows the calculated purities of the elution fractions (E1 and E2) that were collected during four reuse cycles of intein-based purification using intein-N prototype column (R43-358132). Purities were determined by size exclusion chromatography (FIG. 7).

TABLE 3

Purity of eluted target of two consecutive intein purification runs, using intein-N prototype column (R43-358132) and clarified E. Coli lysate, determined by size exclusion chromatography.

| Cycle | Rel. Area %- Target E1 | Rel. Area %- Target E2 |
| --- | --- | --- |
| 1 | 91.9 | 93.5 |
| 2 | 91.0 | 77.4 |
| 3 | 90.4 | 77.0 |
| 4 | 91.8 | 70.9 |

Figure 8:
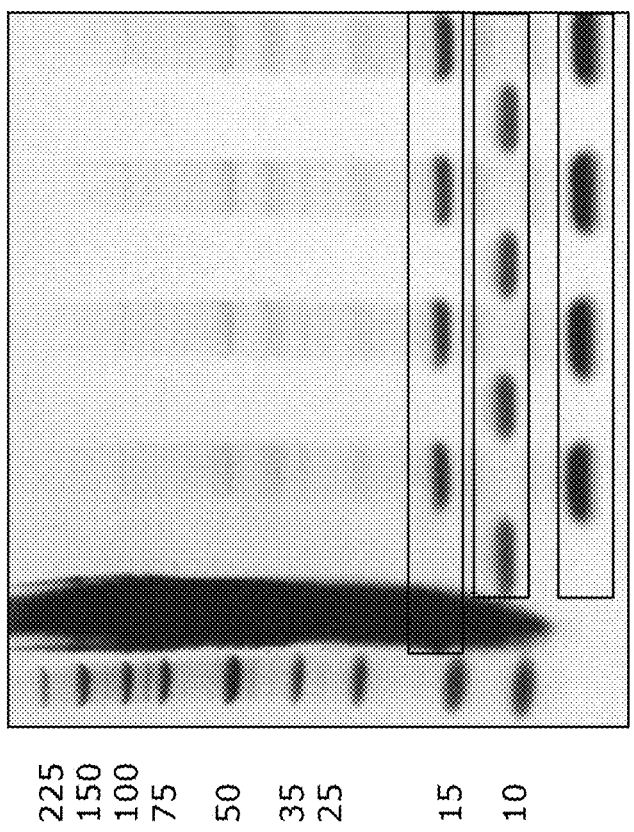
FIG. 8: SDS-Page intein-Purification cycle study samples. The gel visualizes the band composition of the clarified E. coli lysate containing intein-C target that was used as load to the intein-N ligand prototype R43-358132 (S). Elution fractions (E1 and E2) for all 4 cycles of reuse (Cycle 1-5) was loaded for SDS-Page analysis.

A sample size of intein-C target containing cell lysate, the elution (E1, E2) and the cleaning (CIP) fractions were mixed and analyzed by SDS-Page chromatography. FIG. 8 depicts SDS-Page intein-Purification cycle study samples. The gel visualizes the band composition of the clarified $E.$ $coli$ lysate containing intein-C target that was used as load to the intein-N ligand prototype column R43-358132 (S). A sample size elution fractions (E1 and E2) for all 4 cycles of reuse (Cycle 1-5) was loaded for SDS-Page analysis. According to the band scheme that is represents the protein amount in the elution fractions, the concentration separation of intein-C target (20 kDa), tagless target (11 kDa) and intein-C could be observed in every cycle in a similar amount, thus confirming the utility of a 0.15M $H_3PO_4$ pH 1.5 in regenerating intein columns under these conditions.

Figure 9:
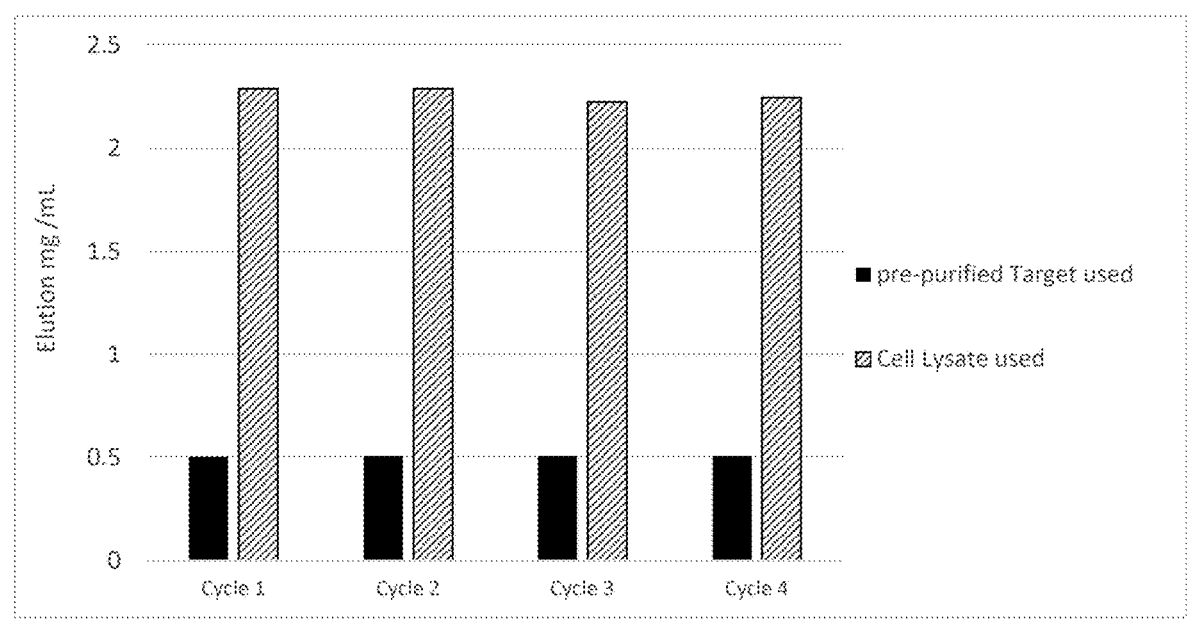
FIG. 9: shows the amounts of eluted target in mg/mL of intein-based purifications of Examples 3 and 4.

FIG. 9 shows the amounts of eluted target in mg/mL of intein-based purifications of Examples 3 and 4. Both the reuse study using pre-purified intein-C target (Example 3) as well as the reuse study using clarified cell lysate (Example 4) are represented, including in both series the 4 cycles of reuse (Cycle 1-4).

Example 5: Regeneration of Intein-N Chromatography Resin with Several Acidic Solutions Like 0.01M Glycine This example demonstrates the reuse of a chromatographic support carrying an immobilized second generation intein-N ligand (18RSAB007). The column was loaded with pre-purified intein-C target (40 kDa), washed with Capture Buffer as describes in Examples 3 and 4, and cleaned in a regeneration process with 10 mM Glycine HCl pH1. According to the overlay of the two absorbance spectrums recorded at 280 nm (A280) (FIG. 10) and an SDS-Page analysis of two sequential column runs (FIG. 11), there was no difference in functionality between the first and the second round of column use. This serves as another example that a This confirms that successful column regeneration process can be accomplished with low pH solution such as Glycine containing buffers.

Figure 10:
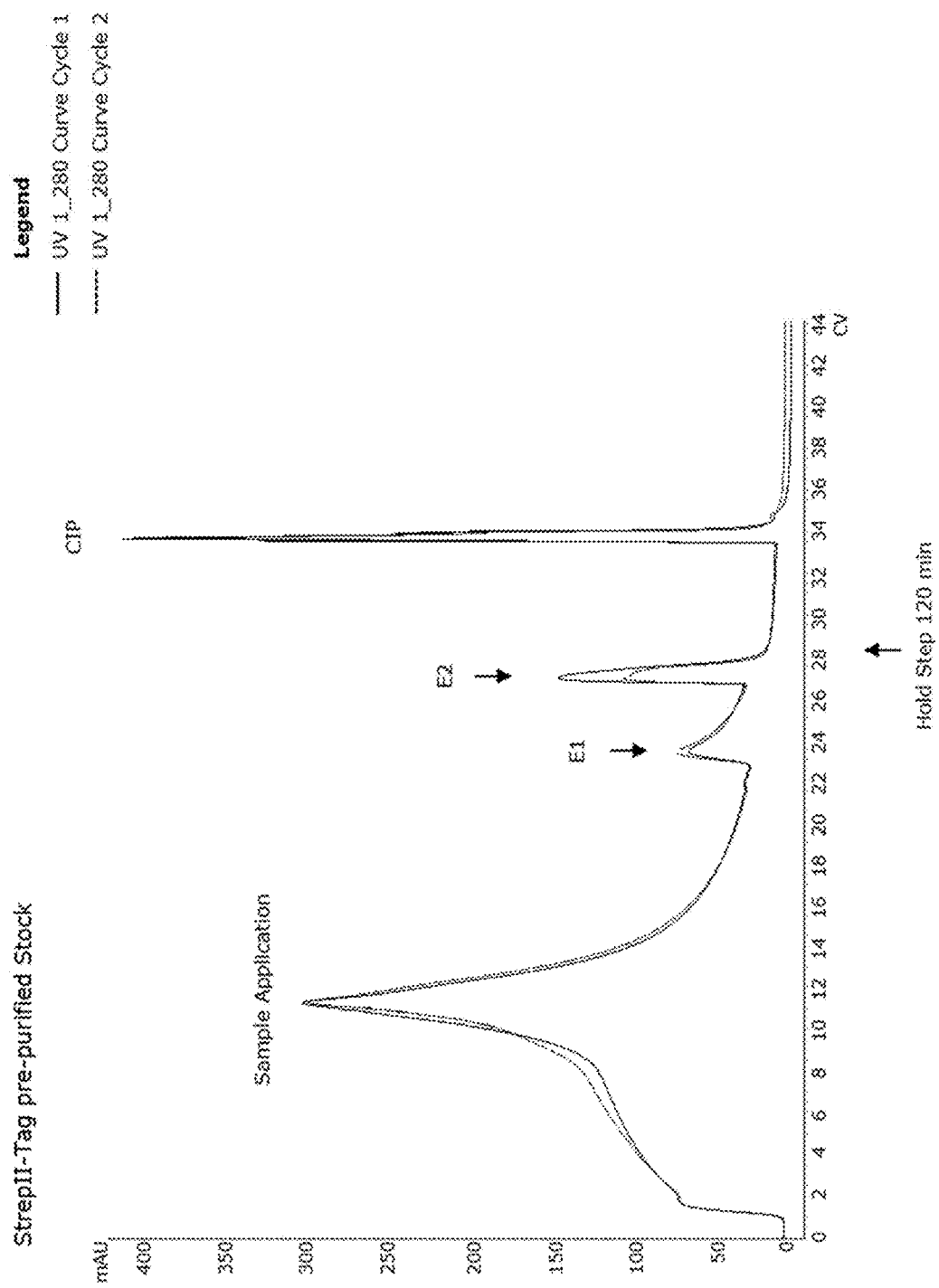
FIG. 10: Overlay of absorbance measured at 280 nm (A280) Chromatogram of a prototype named 18RSAB007 carrying an immobilized intein-N ligand that was used for two consecutive rounds of purification. First round of the A280 signal is shown in solid, second round of the A280 is shown in a dotted line. Each round, the column was loaded with 40 kDa intein-C tagged target (DNAJ) until breakthrough was achieved. The column was washed with a buffer at pH9, and elution of the cleaved target DNAJ was triggered by a change in the pH to 7. After elution, the column was washed at pH 9 and cleaned with Regeneration Buffer (10 mM Glycine-HCl pH 1.0) to trigger release of intein-C. After cleaning the column was re-equilibrated using buffer at pH 9 and was subjected to the next round of reuse.

FIG. 10 is an overlay of absorbance measured at 280 nm (A280) Chromatogram of a prototype named 18RSAB007 (carrying an immobilized intein-N ligand that was used for two consecutive rounds. First round of the A280 signal is shown in solid, second round of the A280 is shown in a dotted line. Each round, the column was loaded with intein-C tagged target (DNAJ) until breakthrough was achieved. The column was washed with Capture buffer (100 mM Tris, 200 mM NaCl pH9), and elution of the cleaved target DNAJ was triggered by a change in the pH with Cleavage Buffer (100 mM Tris, 200 mM NaCl pH7). After elution, the column was washed with Equilibration Buffer (100 mM Tris, 200 mM NaCl pH 9) and cleaned with Regeneration Buffer (10 mM Glycine-HCl pH 1,0) to trigger release of intein-C. After cleaning the column was reequilibrated using Capture buffer (100 mM Tris, 200 mM NaCl pH9) and the column was subjected to another round of reuse.

Figure 11:
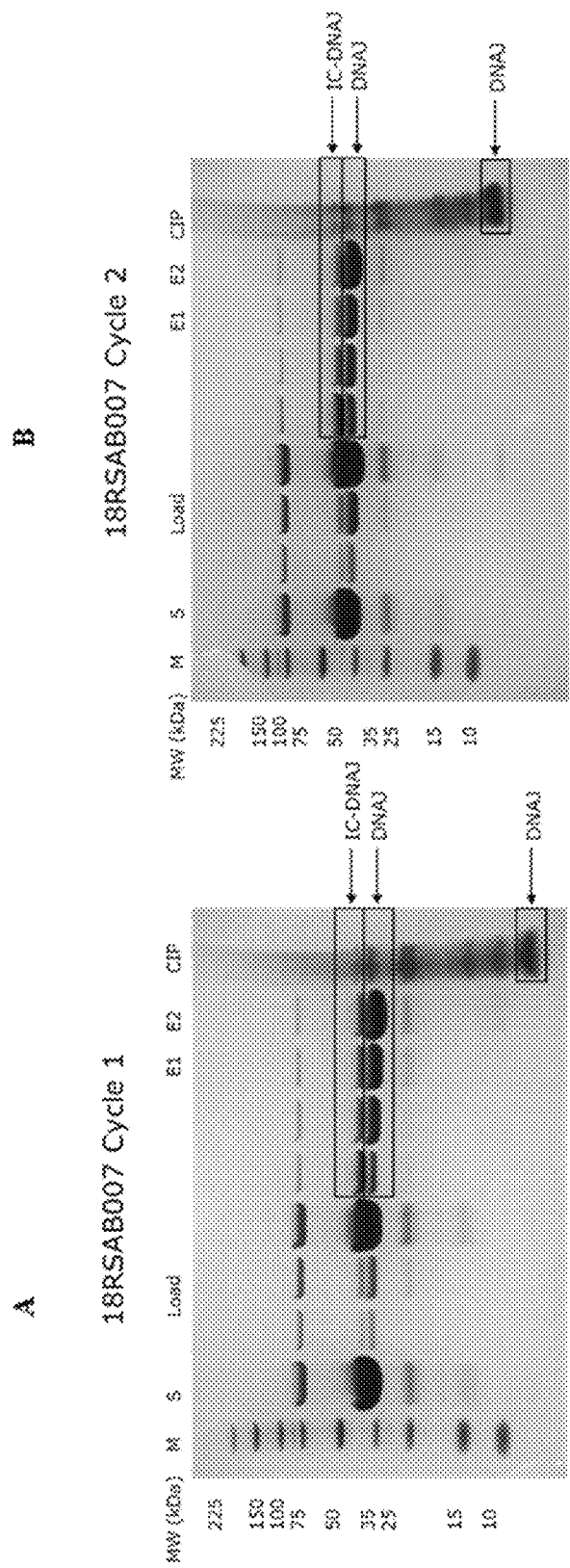
FIG. 11: SDS-Page of fractions taken from functionality tests of prototype 18RSAB007. Both SDS-Page analysis (FIG. 11A: Cycle 1.

Samples of Load, Elution (E1, E2) and Cleaning (CIP) were analyzed by SDS-Page (FIG. 11). FIG. 11 shows SDS-Page analysis of fractions taken from functionality tests of prototype 18RSAB007. Both SDS-Page analysis (FIG. 11A: Cycle 1; FIG. 11B: Cycle 2) represent a comparable band pattern observed from fractions E1, E2 and CIP between the two cycles of using column prototype 18RSAB007. The cleaning of the column using 10CV of Regeneration Buffer (10 mM Glycine-HCl pH 1.0) led to a release of any column bound intein-C. The column remains its initial functionality while cleaning is accomplished with a glycine containing buffer.

Example 6: The Regeneration of Intein-N Chromatography Resin Will be Achieved with a pH Range of pH 4-pH 1

The regeneration of the third generation of intein-N ligand coupled resin prototype column (R44-358132) with acidic solutions between pH 7-pH 1.5 (phosphate-citrate buffer) was examined. The column was equilibrated in saline buffer at pH 9 and loaded with a 1 mg/ml intein-C tagged target protein solution (20 kDa) that was pre-purified by Strep-II tag purification. The remaining intein-C target was washed with saline buffer at pH 9 (Capture Buffer) and the tagless target protein was released by reducing the pH value to pH 7. The elution phase was separated in a direct flow through elution. The column was then rebuffered in another buffer system at pH 7 (phosphate-citrate buffer) and the column material was regenerated stepwise through a pH gradient regeneration, starting with pH 7 and ending with CIP condition pH 1.5 (0.15 M $H_3PO_4$). For regeneration of column material and release of uncleaved intein-C target and the cleaved intein-C was, a pH value of pH 3.8 was preferred. This setpoint was determined by SDS-Page analysis and A280-Absorbance, shown in FIG. 11A-B).

Figure 12:
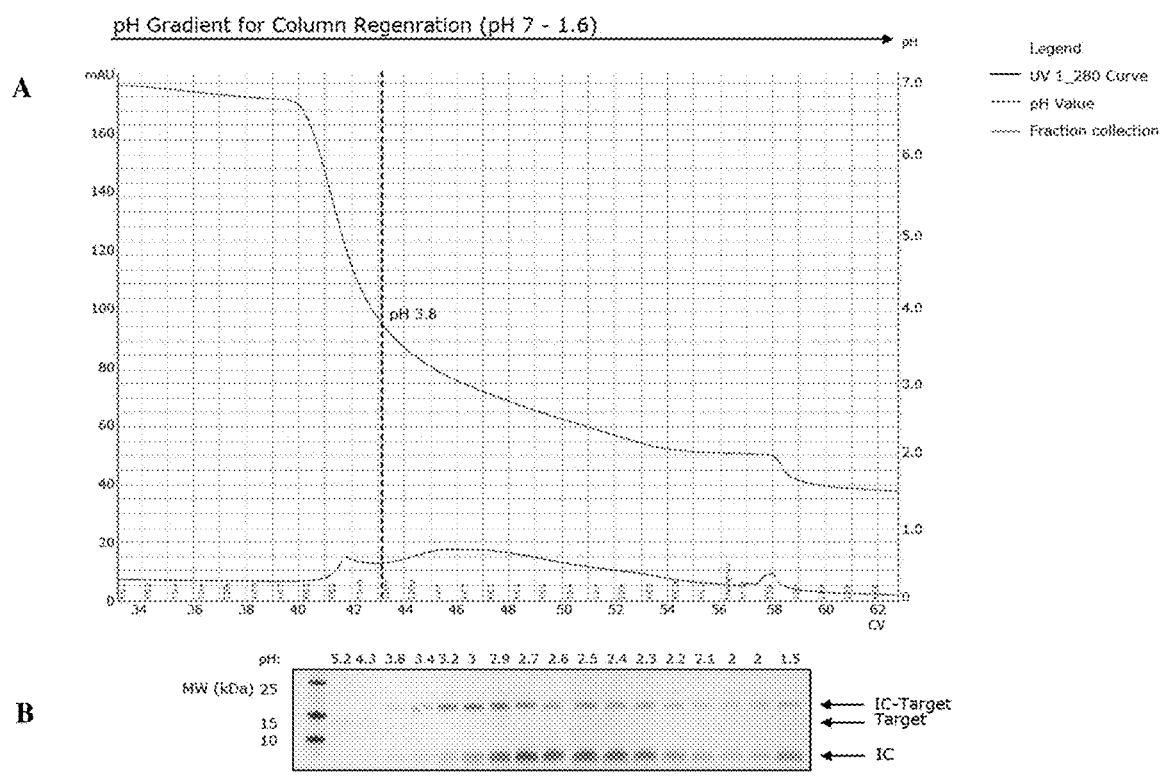
FIG. 12A: Chromatogram of a prototype R44-358132 carrying an immobilized intein-N ligand. The column was loaded with intein-C tagged target (20 kDa) until breakthrough was achieved. The column was washed with saline buffer at pH 9 and elution of the cleaved target was triggered by a change in the pH with the use of Cleavage Buffer.
FIG. 12B: SDS-Page of regeneration fractions D9-F2 from FIG. 12A.

FIG. 12A shows a chromatogram of a prototype column carrying an immobilized intein-N ligand R44-358132. The column was loaded with intein-C tagged target (20 kDa) until breakthrough was achieved. The column was washed with saline buffer at pH 9 (Capture Buffer) and elution of the cleaved target was triggered by a change in the pH with the use of Cleavage Buffer. The shown chromatogram cutout demonstrates the regeneration step of the column after the elution phase. Within 20 CV, the pH of the phosphoric-acid regeneration buffer was reduced permanently until pH 2 and another 5 CV CIP step with 0.15 M $H_3PO_4$ was added. Samples of the regeneration fractions D9-F2 were taken for following SDS-Page, that is shown in FIG. 12B. The regeneration of the column starts at pH 3.8.

Figure 13:
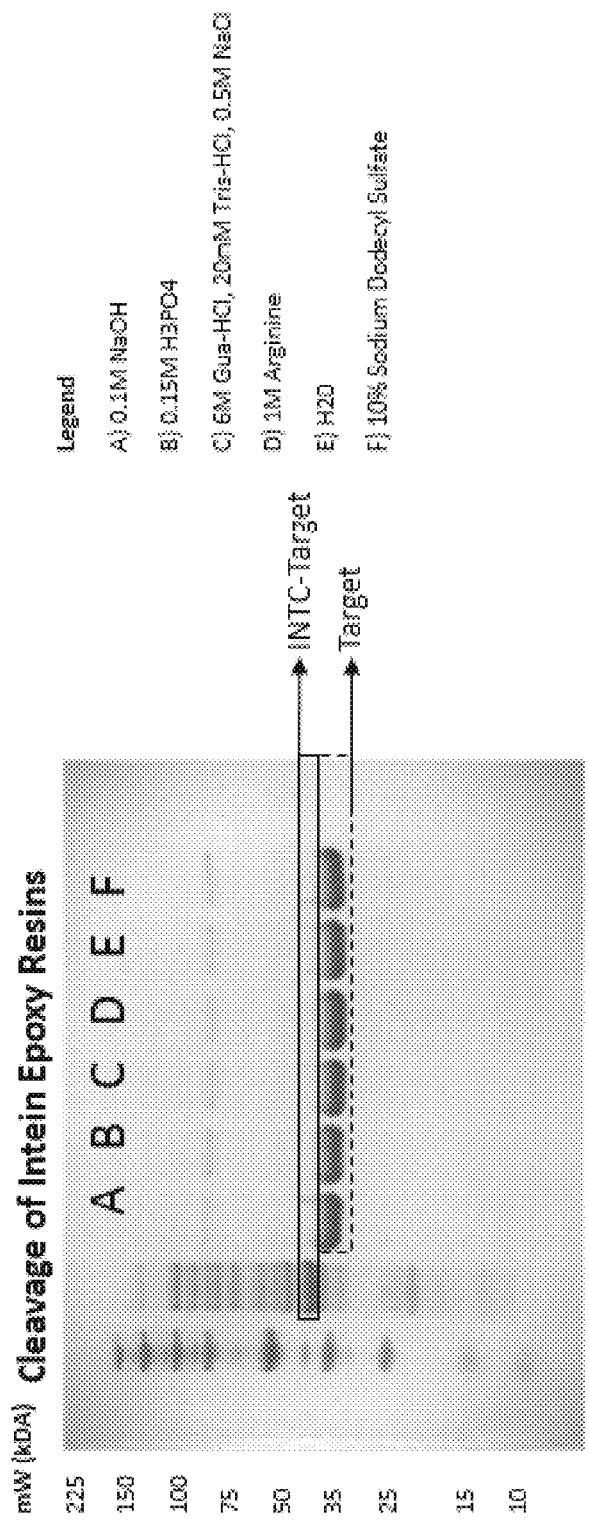
FIG. 13: Chromatography Column carrying intein-N ligand were exposed to 15 min of solution A (0.1M NaOH), B (0.15 $H_3PO_4$), C (6M Guanidine-HCl, 20 mM Tris-HCl, 0.5M NaCl), D (1M arginine), E ($H_2O$), F (10% sodium dodecyl sulfate). Intein-C tagged Target protein (INTC-Target) was loaded and captured on column at pH 9, then cleaved through change in pH to pH7. SDS-Page represents the released target within 20 h under cleavage reaction at Room Temperature. Gels were visualized with a Coomassie blue stain.

Example 7: Reuse of Chromatography Resins Carrying a First Generation Intein-N Ligand with Acidic, Basic, Chaotropic, or Kosmotropic Agents Column carrying intein-N ligand were exposed to 15 min of solution A (0.1M NaOH), B (0.15 $H_3PO_4$), C (6M Guanidine-HCl, 20 mM Tris-HCl, 0.5M NaCl), D (1M arginine), E ($H_2O$), F (10% sodium dodecyl sulfate), representing different classes of acidic, basic, chaotropic, kosmotropic denaturing buffer systems and additives (FIG. 13). Sub sequential 2 column volume (CV) supernatant of lysed $E.$ $coli$ feed including intein-C tagged Target protein (INTC-Target) target was loaded and captured on column with Capture Buffer (100 mM Tris, 200 mM NaCl pH 9). Cleavage reaction was triggered through change in pH to pH7. SDS-Page represents the released target within 20 h under cleavage reaction at Room Temperature.

Column Reuse

Figure 14:
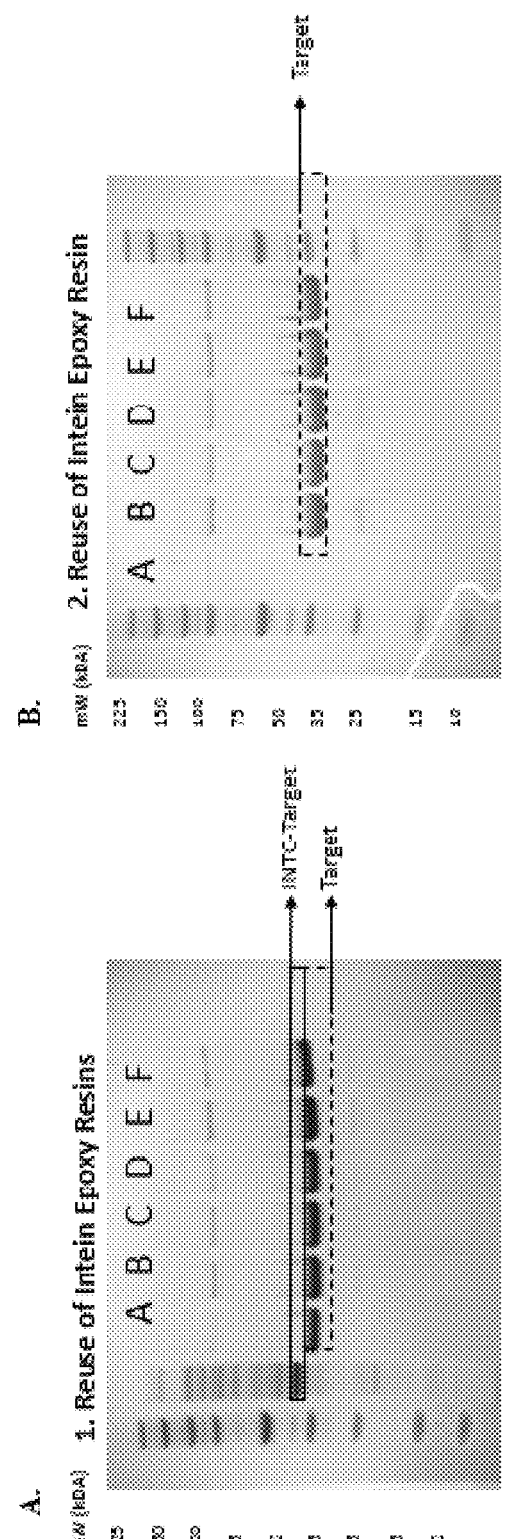
FIG. 14: Chromatography Column carrying intein-N ligand from FIG. 1 were reused and exposed to 150 min of solution A (0.1M NaOH), B (0.15 $H_3PO_4$), C (6M Guanidine-HCl, 20 mM Tris-HCl, 0.5M NaCl), D (1M arginine), E ($H_2O$), F (10% sodium dodecyl sulfate) (FIG. 14A: 1. Reuse) and then to 1500 min of solution A, B, C, D, E, F (FIG. 14B: 2. Reuse). Intein-C tagged Target protein (INTC-Target) was loaded and captured on column at pH 9, then cleaved through change in pH to pH7. SDS-Page represents the released target within 20 h under cleavage reaction at Room Temperature. Gels were visualized with a Coomassie blue stain.

Chromatography column carrying intein-N ligand from FIG. 1 were reused and exposed to 150 min of solution A, B, C, D, E, F (FIG. 14A: 1. Reuse) and subsequently to 1500 min of solution A, B, C, D, E, F (FIG. 14B: 2. Reuse). Each time 2CV supernatant of lysed $E.$ $coli$ feed including intein-C tagged Target protein (INTC-Target) target was loaded and captured on column with a saline buffer system at pH9. Cleavage reaction was triggered through change in pH to pH7. SDS-Page represents the released target within 20 h under cleavage reaction at Room Temperature.

The results show that exposing the intein-N column to an alkaline solution enables the reuse of the intein-N column while inducing dissociation of intein-C from the intein-N column. However, this is accomplished at an expense of column capacity and functionality of non-optimized intein ligands. Exposing the column to more than 150 min 0.1M NaOH causes almost complete loss of the intein-N column functionality, resulting in no further release of the target observed in the 2.Reuse study (compare FIG. 14A Column A and 142B, Column A).

In contrast, exposing the intein-N column to solution B (0.15 $H_3PO_4$), C (6M Guanidine-HCl, 20 mM Tris-HCl, 0.5M NaCl), D (1M arginine), E ($H_2O$), F (10% sodium dodecyl sulfate), enables the reuse of the intein-N column and the efficient dissociation of the intein-C fragment without affecting the column's functionality and the intein-N stability FIG. 14A, 14B, Columns B, C, D, E, F).

Figure 15:
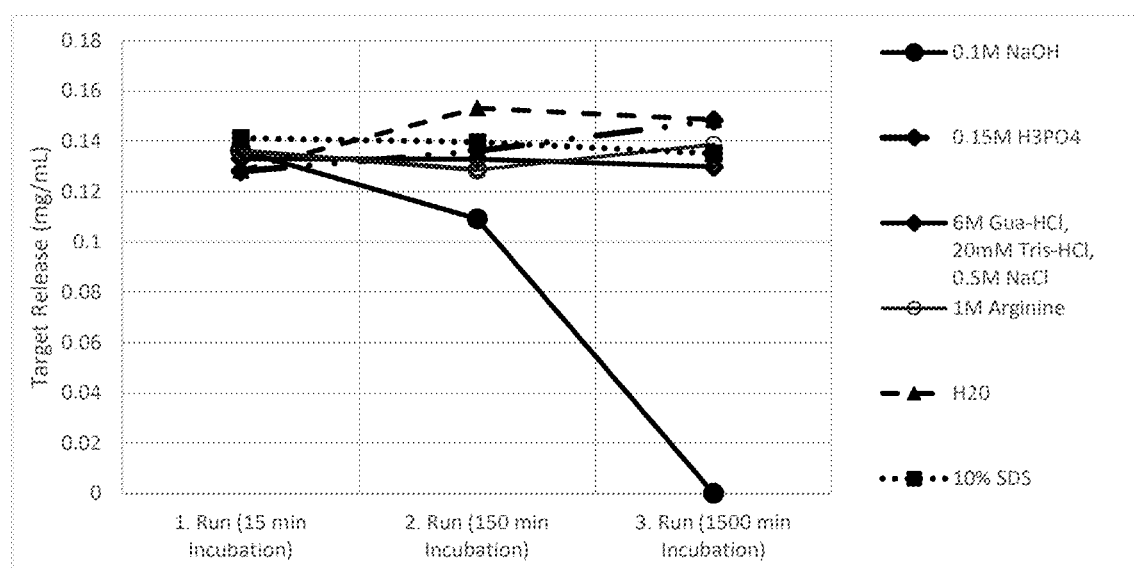
FIG. 15: Depicts the amount of released target protein after three times of intein column usage, incubated with solutions A (0.1M NaOH), B (0.15 $H_3PO_4$), C (6M Guanidine-HCl, 20 mM Tris-HCl, 0.5M NaCl), D (1M arginine), E ($H_2O$), F (10% sodium dodecyl sulfate). Concentrations were determined due to band intensities normed to the known mass of the 50 kD band of the used Protein Marker.

FIG. 15 shows the amount of released Target after 3 times of intein Column Usage, incubated with solutions A, B, C, D, E and F as described above. As seen, after 1,500 min of incubation of intein Column with 0.1M NaOH, no further cleavage activity was observed. However, the amount of released target under different incubation times with solution B, C, D, E, F stays constant within 3 runs of column reuse. Notably, incubation with 1M Arginine having a pH of 12.2 that is in the same pH range than 0.1M NaOH did not lead to a loss in functionality. For all tested solutions, the functionality of the intein-N Column after 1500 min of exposure and 3 times of reuse maintained >90% of its initial capacity. Concentrations were determined due to band intensities normed to the known mass of the 50 kD band of the used Protein Marker Example 8: Effects of Detergents on the Reuse of Chromatography Resins Carrying an Intein-N Ligand Prepared with Epoxy Chemistry Chromatography Columns carrying intein-N ligand were reused 4 times while exposing consecutively to 15/150/1500/1620 min of solution A (0.1M NaOH), B (0.1M NaOH+1M NaCl), C (6M Guanidine-HCl, 20 mM Tris-HCl, 0.5M NaCl), D (0.15 $H_3PO_4$), and E ($H_2O$), representing different classes of alkaline, acidic, chaotropic, kosmotropic buffer systems and additives. Sub sequential 2CV supernatant of lysed *E. coli* feed including intein-C tagged Target protein (INTC-Target) was loaded and captured on column with a saline buffer system at pH 9. Cleavage reaction was triggered through change in pH to pH7. Between each step of Column reuse, the column was washed with 2CV 10% SDS. FIG. 16 shows SDS-Page representing the released target within 20 h under cleavage reaction at Room Temperature.

Figure 17:
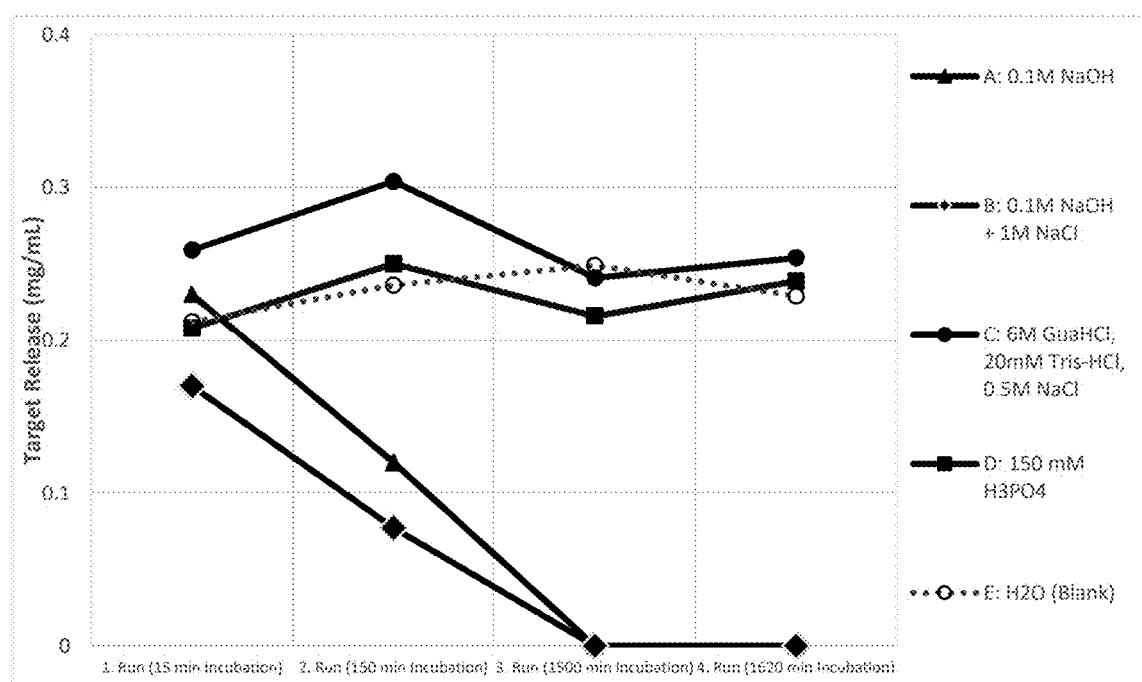
FIG. 17: Depicts the amount of released target protein after four times of intein column usage, Incubated with solutions A (0.1M NaOH), B (0.1M NaOH+1M NaCl), C (6M Guanidine-HCl, 20 mM Tris-HCl, 0.5M NaCl), D (0.15 $H_3PO_4$), and E ($H_2O$). Concentrations were determined due to band intensities normed to the known mass of the 50 kD band of the used Protein Marker.

FIG. 17. depicts the amount of released target protein after four times of intein Column Usage, incubated with solutions A (0.1M NaOH), B (0.1M NaOH+1M NaCl), C (6M Guanidine-HCl, 20 mM Tris-HCl, 0.5M NaCl), D (0.15 $H_3PO_4$), and E ($H_2O$). As seen, after 1500 min of Incubation an intein Column with 0.1M NaOH and 0.1M NaOH+1M NaCl, no further cleavage activity was observed. For all other tested solutions the functionality of the intein-N Column after 1620 min of exposure and 4 times of reuse maintained >90% of its initial capacity. Concentrations were determined due to band intensities normed to the known mass of the 50 kD band of the used Protein Marker.

Thus, FIG. 15 (EXAMPLE 7) shows the concentration of released target after 20 h of Cleavage Reaction. Each of the columns were washed with 10CV $H_2O$ between each reuse, while FIG. 17 (EXAMPLE 8) shows the concentration of released target after 20 h of Cleavage Reaction while washing each column with 2CV of 10% SDS between each reuse. Comparing both figures demonstrates that in both washing conditions the column capacity is maintained at >90% after 3 or 4 times, respectively, of column reuse. Thus, as demonstrated herein, both procedures can be used to regenerate the column while disrupting the INTC-INTN complex after the cleavage reaction took place.

Figure 18:
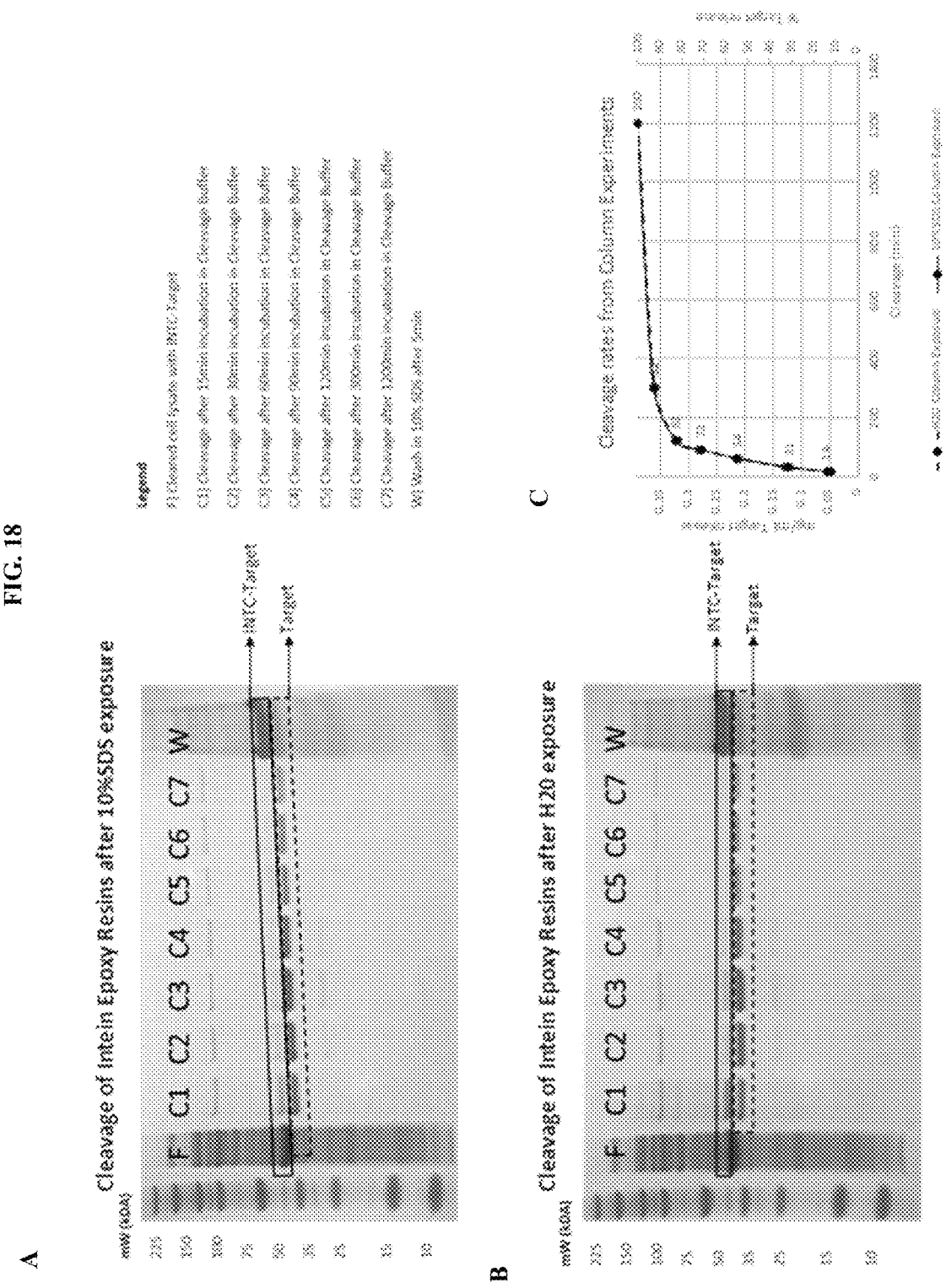
FIG. 18: Shows Cleavage Kinetics of 2 Chromatography Columns carrying intein-N ligand after exposing to 20 h of 10% SDS (FIG. 18A) or 20 h of $H_2O$ (FIG. 18B). Intein-C tagged Target protein (INTC-Target) was loaded and captured on the column with a saline buffer system at pH 9, then cleaved through change in pH to pH7. Cleavage rates (FIG. 18C) were determined based on band intensities of C1-C7 normalized to the known mass of the 50 kD band of the used Protein Marker.

FIG. 18 shows Cleavage Kinetics of 2 Chromatography Columns carrying intein-N ligand after exposing to 20 h of 10% SDS (FIG. 18A) and 20 h of $H_2O$ (FIG. 18B). 2CV supernatant of lysed *E. coli* feed including intein-C tagged Target protein (INTC-Target) was loaded and captured on each column with a saline buffer system at pH 9. Cleavage reaction was triggered through change in pH to pH7. Cleavage rates were determined due based on band intensities of C1-C7 normalized to the known mass of the 50 kD band of the used Protein Marker. As seen, the column exposed to 20 h $H_2O$ shows the same cleavage rates compared to the column exposed to 20 h of 10% SDS. In both cases the target release was >90% within a reaction timeframe of 300 min (5 h).

The foregoing description of the specific embodiments will so fully reveal the general nature of the disclosure that others can, by applying knowledge within the skill of the relevant art(s) (including the contents of the documents cited and incorporated by reference herein), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While various embodiments of the present disclosure have been described above, it should be understood that they have been presented by way of examples, and not limitation. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What is claimed is:

1. A method for purifying a target molecule in a sample, the method comprising the steps of
    (a) providing a sample containing a fusion protein comprising an intein-C polypeptide joined to a target molecule by a peptide bond (intein-C tagged target molecule);
    (b) contacting the sample with a chromatography resin comprising a covalently-linked N-terminal intein polypeptide, under conditions in which the intein-C polypeptide in the fusion protein binds to the intein-N polypeptide in the resin to form an intein complex;
    (c) optionally washing the resin containing the intein complex to remove unbound contaminants;
    (d) exposing the intein complex to conditions sufficient to release the target molecule from the intein-C polypeptide;
    (e) regenerating the chromatographic resin by contacting the resin with a composition having a pH in aqueous solution of about 1 to about 4;
        so as to disrupt the intein-N intein-C complex and release the intein-C polypeptide from the chromatography resin; and
    (f) optionally, performing at least one additional purification cycles by repeating steps (a) to (e) at least once, wherein the regenerated chromatography resin obtained from step (e) or optional step (f) retains at least about 60%, preferably at least about 70% and more preferably at least about 80% of its C-terminal intein binding capacity after each purification cycle.

2. The method according to claim 1, wherein in step (e) the aqueous solution has a pH of about 1 to about 2.

3. The method according to claim 1, wherein step (e) further comprises regenerating the chromatographic resin by contacting the resin with at least one detergent.

4. The method according to claim 1, wherein step (e) further comprises regenerating the chromatographic resin by contacting the resin with a composition comprising at least one kosmotropic agent.

5. The method according to claim 1, wherein step (e) further comprises regenerating the chromatographic resin by contacting the resin with a composition comprising at least one chaotropic agent.

6. The method according claim 1, further comprising the step of performing at least one purification cycle wherein the resin is contacted with a basic composition having a pH in aqueous solution of about 9 or higher.

7. The method according to claim 1, wherein the intein-C tagged target molecule is prepared by attaching an intein-C polypeptide to a target molecule to obtain a fusion protein, and expressing the fusion protein in an expression system.

8. The method according to claim 1, wherein step (b) comprises contacting the chromatography resin with a cell culture supernatant comprising the intein-C tagged target molecule; or wherein step (b) comprises loading the intein-C tagged target molecule in a saline buffer having a pH of about 8 to about 10.

9. The method according to claim 1, wherein step (c) is performed, and comprises washing the chromatography resin with a washing buffer prior to releasing the target molecule from the intein-C polypeptide.

10. The method according to claim 1, wherein step (d) comprises contacting the resin with a cleavage buffer having a pH of about 6 to about 8, so as to release the target molecule from the intein-C polypeptide.

11. The method according to claim 1, wherein the composition having a pH in aqueous solution of about 1 to about 4 comprises an acidic buffer comprising an acid selected from the group consisting of phosphoric acid, glycine, hydrochloric acid, hydrobromic acid, citric acid, acetic acid, formic acid, lactic acid, carbonic acid, succinic acid, nitric acid, malic acid, oxalic acid, salicylic acid, formic acid, and any combinations thereof.

12. The method according to claim 3, wherein the detergent is selected from the group consisting of anionic detergents, cationic detergents, non-ionic detergents and zwitter ionic detergents.

13. The method according to claim 1, further comprising the step of isolating the target molecule obtained from step (d).

14. The method according to claim 1, wherein the chromatography resin is polymer based or includes a polymer.

15. The method of claim 14, wherein the chromatography resin is formulated on a solid support, wherein the solid support is a bead or a membrane.

16. The method according to claim 1, wherein the target molecule is a protein.

17. The method according to claim 1, wherein the intein-N polypeptide is attached to the chromatography resin through a functional group selected from the group consisting of hydroxyl, thiol, epoxide, amino, carbonyl epoxide and carboxylic acid.

18. The method according to claim 12, wherein the detergent is selected from polysorbates, polyethylene glycols, glycosides, poloxamers, 3-[(3-Cholamidopropyl)dimethylammonio]-1-propanesulfonate, 3-[(3-Cholamidopropyl)dimethylammonio]-2-hydroxy-1-propanesulfonate, alkylbenzenesulfonates, quaternary ammonium salts, and bile acids.

19. The method according to claim 4, wherein the kosmotropic agent is an ionic kosmotropic agent or a nonionic kosmotropic agent selected from the group consisting of carbohydrates, amino acids and alcohols.

20. The method according to claim 5, wherein the chaotropic agent is selected from the group consisting of guanidinium chloride, arginine, n-butanol, ethanol, lithium perchlorate, lithium acetate, magnesium chloride, phenol, 2-propanol, sodium dodecyl sulfate, thiourea, urea, and any combination thereof.

* * * * *